US011074447B1

(12) United States Patent
Fox et al.

(10) Patent No.: US 11,074,447 B1
(45) Date of Patent: Jul. 27, 2021

(54) LAND ANALYSIS SYSTEM USING DRONE-CAPTURED DATA

(71) Applicant: Hana Resources, Inc., Lake Forest, CA (US)

(72) Inventors: Andrew John Fox, Irvine, CA (US); Michelle Caruana, Laguna Hills, CA (US)

(73) Assignee: Hana Resources, Inc., Lake Forest, CA (US)

( * ) Notice: Subject to any disclaimer, the term of this patent is extended or adjusted under 35 U.S.C. 154(b) by 184 days.

(21) Appl. No.: 16/510,713

(22) Filed: Jul. 12, 2019

Related U.S. Application Data

(60) Provisional application No. 62/697,573, filed on Jul. 13, 2018.

(51) Int. Cl.
| | |
|---|---|
| *G06K 9/62* | (2006.01) |
| *G06N 3/08* | (2006.01) |
| *B64C 39/02* | (2006.01) |
| *G05D 1/10* | (2006.01) |
| *G06K 9/00* | (2006.01) |
| *G08G 5/00* | (2006.01) |

(52) U.S. Cl.
CPC ........ *G06K 9/00657* (2013.01); *B64C 39/024* (2013.01); *G05D 1/101* (2013.01); *G06K 9/6202* (2013.01); *G06N 3/08* (2013.01); *G08G 5/003* (2013.01); *B64C 2201/123* (2013.01)

(58) Field of Classification Search
None
See application file for complete search history.

(56) References Cited

U.S. PATENT DOCUMENTS

| | | | |
|---|---|---|---|
| 3,053,480 A * | 9/1962 | Vanderlip | ............... B64C 27/54 244/17.13 |
| 5,764,819 A | 6/1998 | Orr et al. | |
| 7,298,869 B1 | 11/2007 | Abernathy | |
| 9,265,204 B2 | 2/2016 | Younis et al. | |
| 9,495,597 B2 * | 11/2016 | Hundley | ............ G06K 9/00657 |
| 9,504,213 B2 | 11/2016 | Levine et al. | |
| 9,684,832 B2 * | 6/2017 | Dieruf | ................ G06K 9/00657 |
| 9,811,849 B2 | 11/2017 | Bursey | |
| 9,880,537 B2 | 1/2018 | Mewes | |

(Continued)

OTHER PUBLICATIONS

Golf Course Management Magazine, *Remote control*, pp. 58, 60, 62, 64, Mar. 17, 2017.

(Continued)

*Primary Examiner* — Santiago Garcia
(74) *Attorney, Agent, or Firm* — Knobbe, Martens, Olson & Bear, LLP

(57) ABSTRACT

A land analysis system uses drone-captured images to detect plant health and/or soil moisture levels at a site. For example, the system instructs a drone to fly along a flight path, capture images of the land below, and measure altitude data. The system processes the images using, for example, artificial intelligence, to identify locations at which plant material may be present. The system then further processes the images to identify the plant health of the plant material at the identified locations. The system further uses the altitude data to determine the strata of plants at the identified locations. Optionally, the system can further process the images to identify the soil moisture levels at the identified locations.

28 Claims, 16 Drawing Sheets

(56) References Cited

U.S. PATENT DOCUMENTS

| | | | |
|---|---|---|---|
| 9,965,962 B1* | 5/2018 | X | G06Q 40/08 |
| 9,984,455 B1* | 5/2018 | Fox | G05D 1/0022 |
| 10,560,666 B2* | 2/2020 | Chandra | G08G 5/0013 |
| 10,621,433 B1* | 4/2020 | Guglielmo | G06K 9/00362 |
| 10,636,174 B2* | 4/2020 | Sugaya | G06T 7/0002 |
| 10,699,408 B2* | 6/2020 | Brown | G06T 7/0012 |
| 10,708,572 B2* | 7/2020 | Nishita | H04N 13/221 |
| 10,765,091 B2* | 9/2020 | Miyahara | G06Q 10/06311 |
| 10,769,466 B2* | 9/2020 | Britto Mattos Lima | G06K 9/6267 |
| 10,852,724 B2* | 12/2020 | Sant | G01S 17/88 |
| 2001/0036295 A1* | 11/2001 | Hendrickson | G01J 3/2823 382/110 |
| 2014/0146173 A1 | 5/2014 | Joyce et al. | |
| 2015/0022656 A1 | 1/2015 | Carr et al. | |
| 2016/0012632 A1* | 1/2016 | Kishikawa | G09B 29/106 345/419 |
| 2016/0300375 A1* | 10/2016 | Beckett | G06T 3/4092 |
| 2016/0307373 A1 | 10/2016 | Dean et al. | |
| 2016/0360072 A1* | 12/2016 | Inamura | H04N 1/603 |
| 2017/0124745 A1* | 5/2017 | Christ | G01C 11/04 |
| 2017/0349635 A1 | 12/2017 | Gil et al. | |
| 2018/0350054 A1 | 12/2018 | Fox et al. | |
| 2019/0147249 A1* | 5/2019 | Kiepe | G06K 9/4652 382/110 |
| 2020/0033890 A1* | 1/2020 | Sugaki | G05D 1/0088 |
| 2020/0293066 A1* | 9/2020 | Shibata | G01S 19/393 |
| 2020/0327326 A1* | 10/2020 | Gavish | G06K 9/6274 |
| 2021/0150184 A1* | 5/2021 | Dai | G01C 21/343 |
| 2021/0155342 A1* | 5/2021 | Nakagawa | B64C 39/024 |

OTHER PUBLICATIONS

GreenSight Ag named one of Boston's 10 drone companies to watch, Oct. 21, 2015.

GreenSight Agronomics Launching Their Second Generation Turfgrass Drone Service, Oct. 20, 2016.

GreenSight Featured in Superintendent Magazine Article, May 18, 2015.

GreenSight Ready to Launch Summer Trials, Jun. 29, 2016.

Dogliotti et al., Detecting and Quantifying a Massive Invasion of Floating Aquatic Plants in the Rio de la Plata Turbid Waters Using High Spatial Resolution Ocean Color Imagery, Remote Sensing, vol. 10, Issue 7, Jul. 19, 2018.

LeddarTech, Drones Adopt LiDar Sensor Altimeters, https://leddartech.com/drones-adopt-lidar-sensor-altimeters/, May 26, 2016.

Sentek Systems, NDVI Definitions (Red, Blue, Enhanced)—Avada Landing Product, www.senteksystems.com/2015/11/23/ndvi-definitions-red-blue-enahcned/, retrieved Jul. 12, 2019.

* cited by examiner

LAND ANALYSIS SYSTEM USING DRONE-CAPTURED DATA

CROSS-REFERENCE TO RELATED APPLICATIONS

This application claims priority under 35 U.S.C. § 119(e) to U.S. Provisional Patent Application No. 62/697,573, entitled "LAND ANALYSIS SYSTEM USING DRONE-CAPTURED DATA" and filed on Jul. 13, 2018, which is hereby incorporated by reference herein in its entirety.

BACKGROUND

Occasionally, land becomes damaged or degraded due to human actions, such as construction, contamination, the introduction of invasive species, and/or the like. This damage or degradation can negatively affect the health of native vegetation and/or the population of endangered species. In fact, such damage or degradation can negatively impact humans. For example, disturbing the natural habitat of the land can increase the risk of flooding, reduce access to clean water, or reduce recreational opportunities. Thus, a land owner or a government entity may attempt to restore the land to its natural habitat by reintroducing native vegetation and attempting to recreate the original native vegetation coverage.

As part of the habitat restoration process, it may be important track the health of the native vegetation and/or soil at a site over time. Currently, this task is performed by a biologist. For example, the biologist may visit the site, collect plant samples and/or soil samples from a specific area or portion of the site (e.g., along a transect), analyze the samples in a lab to identify plant health and/or the soil status (e.g., by running chemical tests on the samples and inspecting the results), and estimate plant health in the entire site based on the analysis. However, because the biologist takes samples from just a portion of the site, the plant health and/or soil status estimates are often subjective and ultimately imprecise.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for determining plant health. The system comprises an unmanned aerial vehicle, where the unmanned aerial vehicle comprises a camera and an altimeter. The system further comprises a computing system comprising one or more computing devices, where the computing system is configured to communicate with the unmanned aerial vehicle and configured with specific computer-executable instructions to: instruct the unmanned aerial vehicle to capture a first set of images and a second set of images using the camera and to capture altitude data using the altimeter while flying along a flight path; process the first set of images to form a first stitched image; process the second set of images to form a second stitched image; identify a portion of the first stitched image corresponding to plant material based on an application of the first stitched image as an input to a trained machine learning model; determine that a first set of geographic coordinates correspond to the portion of the first stitched image; determine heights of the plant material using the altitude data corresponding to the first set of geographic coordinates; and determine health of the plant material based on values of pixels in the second stitched image corresponding to the first set of geographic coordinates.

The system of the preceding paragraph can include any sub-combination of the following features: where the altitude data comprises an altitude of the unmanned aerial vehicle at a first geographic coordinate in the first set of geographic coordinates and a distance between the unmanned aerial vehicle and an object below the unmanned aerial vehicle at the first geographic coordinate; where the computing system is further configured with specific computer-executable instructions to: obtain an indication of an elevation of land at the first geographic coordinate, and subtract the elevation and the distance from the altitude of the unmanned aerial vehicle to determine a height of a portion of the plant material at the first geographic coordinate; where the computing system is further configured with specific computer-executable instructions to train the machine learning model using training data that comprises a third set of images annotated to indicate portions of the third set of images in which second plant material is present and a fourth set of images annotated to indicate portions of the fourth set of images in which third plant material is not present; where the computing system is further configured with specific computer-executable instructions to generate a shape file that comprises at least one of the first stitched image, an indication that the first set of geographic coordinates correspond to the plant material, an indication of the heights of the plant material, or an indication of the health of the plant material; where the computing system is further configured with specific computer-executable instructions to: generate user interface data that comprises the shape file, and transmit the user interface data to a user device, where the user interface data, when rendered by the user device, causes the user device to display a user interface in which data included in the shape file is depicted; where the computing system is further configured with specific computer-executable instructions to: instruct the unmanned aerial vehicle to capture a third set of images while flying along the flight path, process the third set of images to form a third stitched image, and determine soil moisture levels based on values of pixels in the third stitched image corresponding to the first set of geographic coordinates; where the computing system is further configured with specific computer-executable instructions to instruct the unmanned aerial vehicle to fly at a constant relative flying altitude while flying along the flight path; where the camera comprises a multispectral camera that captures RGB images and chlorophyll images; where the first set of images comprises a first set of RGB images; where the second set of images comprises a second set of chlorophyll images; where each pixel in the first set of images is geo-tagged with a specific geographic coordinate; where the computing system is further configured with specific computer-executable instructions to: receive flight path parameters from a user device over a network, and instruct the unmanned aerial vehicle to capture the first set of images and the second set of images using the camera and to capture altitude data using the altimeter while flying along a flight path in a manner defined by the flight path parameters; and where the flight path parameters comprise at least one of geographic coordinates, waypoints, flight length, flight time, speed, altitude, camera shooting angle, camera capture mode, or camera resolution.

Another aspect of the disclosure provides a computer-implemented method of detecting plant health. The method comprises: as implemented by one or more computing devices configured with specific computer-executable instructions, instructing an aerial vehicle to commence a flight along a flight path such that the aerial vehicle captures a first set of images and a second set of images using a camera and altitude data using an altimeter; generating a first stitched image using the first set of images and a second stitched image using the second set of images; identifying a portion of the first stitched image corresponding to plant material using a machine learning model; determining that a first set of geographic coordinates correspond to the portion of the first stitched image; determining a strata of the plant material using the altitude data corresponding to the first set of geographic coordinates; and determining health of the plant material based on a portion of the second stitched image corresponding to the first set of geographic coordinates.

The computer-implemented method of the preceding paragraph can include any sub-combination of the following features: where the computer-implemented method further comprises training the machine learning model using training data that comprises a third set of images annotated to indicate portions of the third set of images in which second plant material is present and a fourth set of images annotated to indicate portions of the fourth set of images in which third plant material is not present; where the computer-implemented method further comprises generating a shape file that comprises at least one of the first stitched image, an indication that the first set of geographic coordinates correspond to the plant material, an indication of the heights of the plant material, or an indication of the health of the plant material; where the computer-implemented method further comprises generating user interface data that comprises the shape file, and transmitting the user interface data to a user device, where the user interface data, when rendered by the user device, causes the user device to display a user interface in which data included in the shape file is depicted; and where the computer-implemented method further comprises instructing the aerial vehicle to capture a third set of images while flying along the flight path, processing the third set of images to form a third stitched image, and determining soil moisture levels based on values of pixels in the third stitched image corresponding to the first set of geographic coordinates.

Another aspect of the disclosure provides non-transitory, computer-readable storage media comprising computer-executable instructions for detecting plant health, where the computer-executable instructions, when executed by a computer system, cause the computer system to: instruct an aerial vehicle to commence a flight along a flight path such that the aerial vehicle captures a first set of images and a second set of images using a camera; generate a first stitched image using the first set of images and a second stitched image using the second set of images; identify a portion of the first stitched image corresponding to plant material using a machine learning model; determine that a first set of geographic coordinates correspond to the portion of the first stitched image; and determine health of the plant material based on a portion of the second stitched image corresponding to the first set of geographic coordinates.

The non-transitory, computer-readable storage media of the preceding paragraph can include any sub-combination of the following features: where the computer-executable instructions further cause the computer system to determine a strata of the plant material using altitude data corresponding to the first set of geographic coordinates captured by the aerial vehicle using an altimeter; where the computer-executable instructions further cause the computer system to generate a shape file that comprises at least one of the first stitched image, an indication that the first set of geographic coordinates correspond to the plant material, an indication of the heights of the plant material, or an indication of the health of the plant material; where the computer-executable instructions further cause the computer system to: generate user interface data that comprises the shape file, and transmit the user interface data to a user device, where the user interface data, when rendered by the user device, causes the user device to display a user interface in which data included in the shape file is depicted; and where the computer-executable instructions further cause the computer system to: instruct the aerial vehicle to capture a third set of images while flying along the flight path, process the third set of images to form a third stitched image, and determine soil moisture levels based on values of pixels in the third stitched image corresponding to the first set of geographic coordinates.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
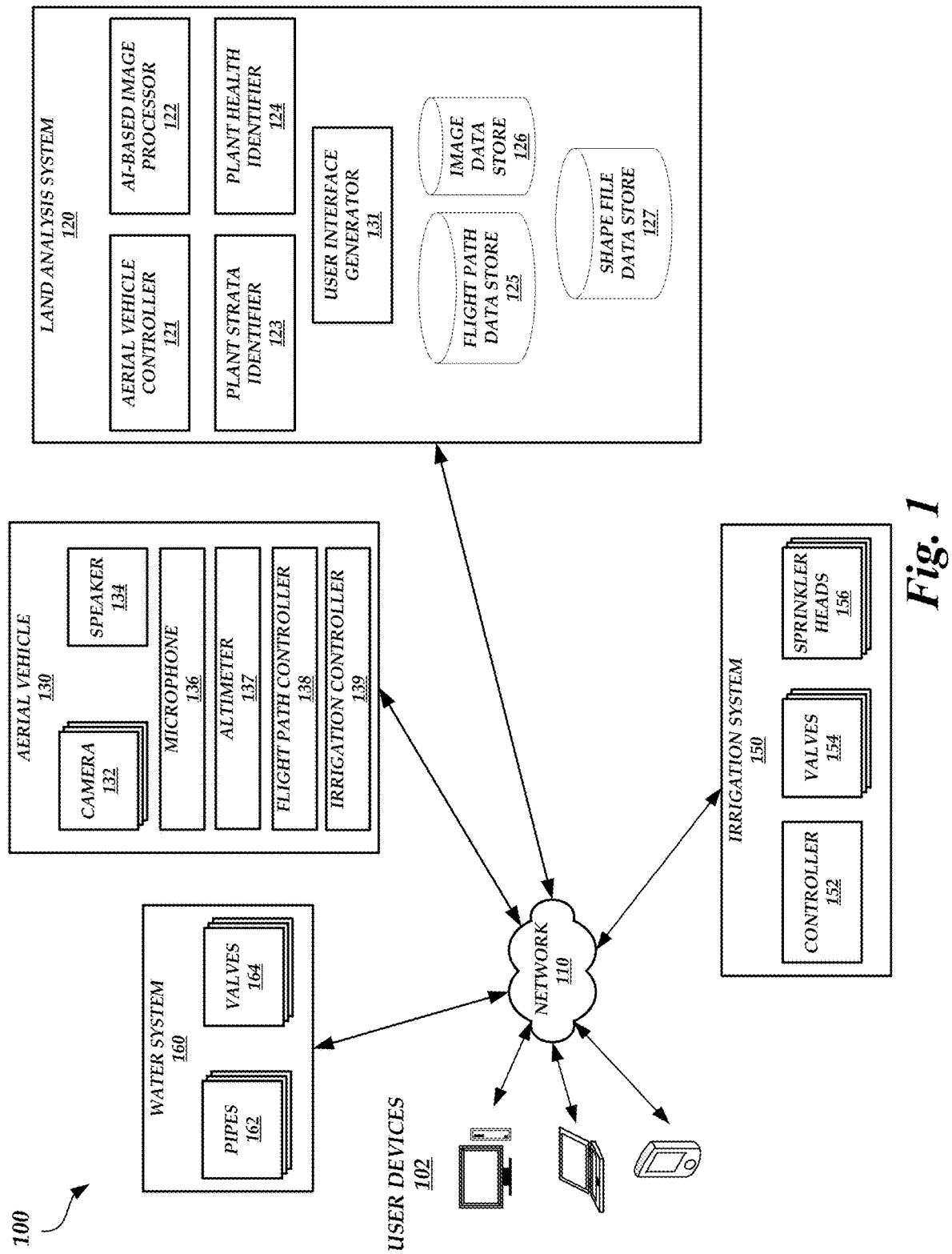
FIG. 1 is a block diagram of an illustrative operating environment in which a land analysis system uses images captured by an aerial vehicle to determine plant health and/or soil moisture levels.

As described above, the current process of estimating plant health and/or soil status (e.g., level of moisture in the soil) at a site (e.g., a parcel or plot of land) is subjective and imprecise. For example, portions of a site may be inaccessible by a human due to the terrain, plant species that are present, bodies of water that are present, and/or animal species that are present. In some cases, portions of a site may be accessed. However, if such portions are accessed, this may cause a disturbance in the site and result in inaccurate measurements and/or damage to the native vegetation and/or animal species. Thus, biologists often take samples from just a transect of the site and generate plant health and/or soil status estimates based on an extrapolation of the data collected from the transect. Conventional computing systems could be used to generate plant health and/or soil status estimates based on samples collected by biologists. However, these conventional computing systems do not resolve inaccuracies that may result from the samples being collected in just a transect of a site.

In particular, a biologist may analyze the collected samples to identify the health of plant species that were present in the transact and/or to identify the level of moisture in the soil (e.g., by running chemical tests on the samples and inspecting the results) and estimate plant health and/or soil moisture in the entire site based on the analysis. However, a site generally will not have a uniform distribution of plants, moisture, nitrogen, and/or other matter. For example, the terrain of the site, the amount of available sunshine, the level of the water table, and/or other factors may affect the health of plants and/or the level of moisture in the soil in a specific transect of the site. Thus, the estimation then may greatly depend on the transect from which the biologist collected samples. Given the subjectivity and variability of this estimation, it may be important to implement techniques for analyzing the plant health and/or soil moisture across an entire site.

Accordingly, aspects of the present disclosure provide a land analysis system that uses drone-captured images to identify the current health of plants and/or the level of soil moisture at a site. In particular, the land analysis system can identify plant health for different strata of plants (e.g., herbaceous species, shrub species, tree species, etc.). For example, a user, via a user device, may communicate with the land analysis system to set the flight path of a drone or another aerial vehicle. The drone may be equipped with one or more cameras, such as a thermal imaging camera, a high-resolution camera (e.g., 4K, 8K, etc.), a multispectral camera (e.g., a camera that captures images in one or more different, narrow spectral bands, such as blue band, green band, red band, red edge band, near-infrared band, etc., optionally in addition to capturing high-resolution, red, green, blue (RGB) images), and/or the like. In an embodiment, the flight path is set such that the drone will capture images covering an entire site. Once the flight path is set, the land analysis system can transmit flight path data to the drone over a network (or a wired or wireless point-to-point link) and instruct the drone to conduct a series of flights over a period of time, where each flight follows the same flight path. For example, flights may take place once ever few weeks, months, years etc. The drone may communicate with a satellite system (e.g., a global positioning system (GPS)) and/or terrestrial system to fly according to the received flight path data. As the drone flies along the provided flight path, the drone may periodically capture images of the land underneath the drone. For example, the drone can capture images directly underneath the drone (e.g., the camera(s) may be positioned such that a lens is approximately parallel with the land) and/or at an angle (e.g., the camera(s) may be positioned such that a lens deviates from being parallel with the land by a certain angle). The drone may capture images using one or more of the cameras and transmit such images to the land analysis system and/or to a user device (directly or via the land analysis system) in real-time, in near real-time, and/or after the flight is complete.

In some embodiments, the drone captures one or more images at each position. For example, one image may be a chlorophyll image that provides an indication of plant health (e.g., the image identifies the reflection of near-infrared energy, where the higher the reflection the more healthy a plant is), another image may be a normalized difference vegetation index (NDVI) image that depicts a comparison of a reflectance of red visible light with a reflectance of near-infrared light (e.g., where the image can be used to determine soil moisture), another image may be an RGB image (e.g., a natural color photo), etc. In further embodiments, the drone can capture a blue channel version of the NDVI that depicts a comparison of a reflectance of blue visible light (instead of red visible light) with a reflectance of near-infrared light.

As the drone flies along the provided flight path, the drone may also continuously measure altitude data. Specifically, the drone may use an altimeter to measure a distance between an altitude of the drone and a height of an object (e.g., plant, building, animal, ground, water, etc.) below the drone. The altimeter can use radio detection and ranging (RADAR) technology, light detection and ranging (LIDAR) technology, sound navigation and ranging (SONAR) technology, and/or the like to determine the distance between the drone and an object below the drone. The altimeter can measure this distance at varying resolutions, such as at each geographic location that may correspond to a pixel in an image captured by the camera of the drone.

Once the images and altimeter data are captured, the land analysis system may stitch similar images together (e.g., chlorophyll images together, NDVI images together, RGB images together, etc.) to form a single stitched image for a given type of image. For example, each image of a certain type (e.g., the boundaries of the image, edges of the image, vertices of the image, individual pixels within the image, etc.) may correspond with one or more geographic coordinates (e.g., GPS coordinates). The land analysis system can stitch the received images using the geographic coordinates as a guide (e.g., the plant health prediction system can append an edge of one image to a portion of another image if the edge and portion each correspond to the same geographic coordinate or range of geographic coordinates). As described above, the flight path may be set such that the drone captures images covering an entire site. Thus, the stitched image may be an image that captures an entire site. If the drone includes different types of cameras, the land analysis system can segregate images corresponding to a particular type of camera and stitch together those images that originated from a particular type of camera. Thus, the land analysis system may form multiple stitched images.

As an illustrative example, if the drone captures chlorophyll images and RGB images (e.g., captured using the same or different cameras), then the land analysis system can generate a chlorophyll stitched image by stitching the chlorophyll images and an RGB stitched image by stitching the RGB images. As mentioned above, the chlorophyll images may identify plant health. Thus, the chlorophyll stitched image may then be an image that identifies plant health captured within each of the stitched chlorophyll images.

The land analysis system can process an RGB stitched image to identify pixels (which correspond to geographic coordinates) that correspond to plant material. For example, the RGB stitched image may depict plant material, buildings, water, asphalt, animals, and/or other objects. The altitude data includes an indication of a distance between the drone and an object below the drone at various geographic coordinates covered by the RGB stitched image. However, the altitude data may not include an indication of what type of object was present below the drone. Thus, the land analysis system may process the RGB stitched image to specifically identify locations in which plant material was located below the drone.

The land analysis system may use artificial intelligence (e.g., machine learning, neural networks, etc.) to process the RGB stitched image. For example, the land analysis system or another system may have previously trained a machine learning model that identifies plant material in images using supervised and/or unsupervised learning. In one example, the land analysis system or another system may have trained the machine learning model using a set of training data in which various images are annotated to identify portions in which plant material is depicted and/or portions in which plant material is not depicted (e.g., portions in which other objects are depicted).

Once the pixels representing plant material are identified, the land analysis system can identify the corresponding geographic coordinates (e.g., because each pixel or groups of pixels in an RGB image may correspond to a particular geographic coordinate). Plant species may fall into different strata based on the height of such plant species, and the land analysis system can then use the altitude data that includes distance information corresponding to the geographic coordinates associated with the pixels representing plant material to identify the strata of plant material present at the site. For example, a first strata (corresponding to herbaceous species) may be plants having a height of 0.33 m or less, a second strata (corresponding to shrub species) may be plants having a height between 0.33 m and 0.66 m, and a third strata (corresponding to tree species) may be plants having a height above 0.66 m. The altitude data may indicate both an altitude of the drone and a distance between the drone and the plant material below the drone. Separately, the land analysis system can obtain topography data from an external source, in which the topography data includes an indication of an elevation of terrain at various geographic coordinates. By subtracting the distance between the drone and the plant material below the drone from the altitude of the drone, the land analysis system can obtain a height of the plant material with respect to sea level. The land analysis system can then subtract the elevation of the terrain at the location of the plant material from the height of the plant material with respect to sea level to obtain a height of the plant material itself. The land analysis system can compare the obtained height to the height values defining the different strata to identify to which strata the plant material belongs. The land analysis system can repeat this process for some or all of the plant material depicted in the RGB stitched image.

The land analysis system can also use the determined geographic coordinates corresponding to plant material to determine the health of the plant material depicted therein. For example, the chlorophyll stitched image may identify plant health, and the land analysis system can use the geographic coordinates determined to correspond to plant material to identify portions (e.g., pixels) of the chlorophyll stitched image that correspond to plant material. Once the pixels are identified, the land analysis system can analyze the colors of these pixels to determine a health of the plant species corresponding to the respective pixels. In addition, because the land analysis system can use the altimeter data to determine the strata of the plant species present at the site, the land analysis system can not only determine the health of individual plants at the site, but also the health of different strata of plants at the site.

The land analysis system can package the plant strata and/or plant health data into a report and transmit the report to a user device. Alternatively or in addition, the land analysis system can package the plant strata and/or plant health data in a scorecard and transmit the scorecard to a user device. The scorecard may indicate a frequency at which several tasks are to be completed, such as mowing the lawn, fertilizing the soil, trimming shrubs or trees, removing weeds, and/or any other tasks that may affect plant health. Each task may correspond to a raw score weighted based on the frequency at which the respective task is to be completed. The raw scores can be totaled, where the higher the total raw score, the healthier plants are likely to be. The land analysis system can then use the plant strata and/or plant health data to generate updated scores for each of the tasks, totaling the updated scores and including the updated scores and/or the total update score in the scorecard. If the total updated score is significantly below the total raw score, this may indicate that an entity performing the tasks is doing a poor job of maintaining plant health. Conversely, if the total update score is close to the total raw score (or higher than the total raw score), this may indicate that an entity performing the tasks is doing an expected job of maintaining plant health. In addition, the land analysis system can generate user interface data that, when rendered by a user device, causes the user device to display a user interface in which the site, the location of plant material at the site, the strata of various plant species, and/or the health of various plant species are depicted.

The land analysis system can use similar techniques to detect the level of moisture in soil. For example, the land analysis system can optionally use a machine learning model trained to identify soil or plant material (under which soil may be present) to identify pixels of the RGB stitched image in which soil and/or plant material is present. The land analysis system can then obtain geographic coordinates corresponding to the identified pixels, and obtain the color values of pixels in the NDVI stitched image that correspond to the obtained geographic coordinates (e.g., where the color values correspond to soil and/or plant material under which soil is present). The land analysis system can process the color values to determine the level of moisture present in the soil at these locations, as described in greater detail below. Like with the plant health information, the land analysis system can package the soil moisture data into a report and/or scorecard (e.g., where the scorecard indicates scores for various tasks associated with maintaining soil moisture levels) and transmit the report and/or scorecard to a user device. In addition, the land analysis system can generate user interface data that, when rendered by a user device, causes the user device to display a user interface in which the site, the location of soil and/or plant material at the site, and/or the level of moisture in the soil are depicted.

The land analysis system can also use similar techniques to detect algae or other floating vegetation in bodies of water, such as lakes, rivers, reservoirs, seas, oceans, etc. For example, the land analysis system can obtain one or more images of a body of water, and use the image(s) to calculate, for each pixel, a blue channel version of the NDVI that depicts a comparison of a reflectance of blue visible light (instead of red visible light) with a reflectance of near-infrared light. The land analysis system can then determine a median value (or mean value, mode value, etc.) of the blue channel NDVI values and set this value as a threshold value. The land analysis system can then parse the image(s) and classify each pixel that has a value greater than the threshold value as "algae" and classify each pixel that has a value less than the threshold value as "non-algae." As another example, the land analysis system can obtain one or more images of a body of water, and use the image(s) to determine, for each pixel, a floating algae index (FAI) that represents a difference between a Rayleigh-corrected reflectance of the near-infrared (NIR) channel and a ratio between a linear interpolation between the red channel of the RGB band and the shortwave infrared (SWIR) band. If the FAI of a pixel is above 0 and the Rayleigh-corrected red channel of the pixel is below a threshold value, the land analysis system can determine that the pixel corresponds to algae or other floating vegetation. Thus, the land analysis system can determine that the geographic locations corresponding to pixels classified as "algae" or other floating vegetation are geographic locations in which algae or other floating vegetation is present. Like with the plant health information and the soil moisture data, the land analysis system can package the algae detection data (e.g., geographic locations at which algae or other floating vegetation is detected) into a report and/or scorecard (e.g., where the scorecard indicates scores for various tasks associated with increasing and/or decreasing algae or other floating vegetation levels) and transmit the report and/or scorecard to a user device. In addition, the land analysis system can generate user interface data that, when rendered by a user device, causes the user device to display a user interface in which the site and the location of algae or other floating vegetation are depicted.

In further embodiments, the report transmitted to the user device and/or the user interface may indicate an area of the site covered by plant species in various strata (e.g., in acres) and/or a percentage of the site covered by plant species in a particular strata. For example, the land analysis system can determine the area of the site covered by plant species in various strata and/or the percentage of the site covered by plant species in a particular strata using techniques implemented by the plant growth prediction system described in U.S. Pat. No. 9,984,455, entitled "ORGANISM GROWTH PREDICTION SYSTEM USING DRONE-CAPTURED IMAGES" ("the '455 patent"), which is hereby incorporated by reference herein in its entirety.

Thus, unlike the subjective estimations performed by a biologist, the techniques implemented by the land analysis system described herein can result in an objective analysis of plant health, soil moisture levels, and/or algae or other floating vegetation locations. For example, a drone or other aerial vehicle can reach areas of a site that otherwise may be inaccessible or should not be accessed due to the potential damage that may be incurred. Thus, the drone can measure data for an entire site, rather than just a transect, and provide such data to the land analysis system. The land analysis system then can use the data for an entire site to determine an accurate representation of the plant health, soil moisture levels, and/or algae or other floating vegetation locations at a site. The land analysis system, therefore, determines a more accurate representation of the plant health, soil moisture levels, and/or algae or other floating vegetation locations at a site using techniques that previously could not even be performed by biologists.

In addition, because the drone is not necessarily capturing physical samples for later analysis (although this may occur in certain embodiments, as described below), the land analysis system implements different techniques and rules than a biologist in determining plant health, soil moisture levels, and/or algae or other floating vegetation locations. For example, while a biologist may visit a site, retrieve physical vegetation and/or soil samples, and conduct tests on the physical vegetation and/or soil samples in a lab, the land analysis system instead controls a drone and implements image processing techniques (including artificial intelligence rather than human intelligence as may be employed by a biologist) to identify certain characteristics of objects present in the drone-captured images (e.g., pixel patterns that may represent leaves, stems, branches, etc., the amount of near-infrared energy that is being reflected, the amount of shortwave infrared energy that is being reflected, the amount of red visible light being reflected, the amount of blue visible light being reflected, etc.). Such image processing techniques include stitching images, using a machine learning model to identify portions of an image corresponding to plant material and/or soil rather than other objects, identifying color values of certain pixels in an image, and processing the color values to map corresponding plant material and/or soil to health levels, soil moisture levels, and/or geographic locations. In fact, a biologist would not even be able to perform these image processing techniques (e.g., by visually inspecting the physical vegetation and/or soil samples) because the color values present in the chlorophyll images and/or the NDVI images that are analyzed by the land analysis system are derived from drone-captured infrared or near-infrared images, which are images depicting light that is invisible to humans (e.g., infrared light).

Furthermore, the land analysis system described herein is a technical improvement over conventional systems that may attempt to estimate plant health. In particular, unlike the land analysis system, a conventional system may perform certain drone-captured data pre-processing operations just to place the data in a position so that plant health estimation could be attempted. For example, the conventional system may obtain NDVI data captured by an infrared camera of a drone. However, the NDVI data may be represented as a single, polygonal object in which the boundaries of the object, not the individual pixels of the object, correspond to geographic coordinates. Thus, the color of an individual pixel in the object has no correlation to any geographic coordinate, and therefore the object without any further processing cannot be used to identify the plant health of a specific plant at a specific location. Accordingly, the conventional system may have to process the object, pixel-by-pixel, to identify and assign a geographic coordinate to a respective pixel (e.g., by identifying the geographic coordinates of the border of the object and estimating a geographic coordinate of a pixel that is a certain number of pixels from the object border). Only once the pre-processing of the object is completed can the conventional system attempt to estimate plant health.

Accordingly, the land analysis system described herein provides an improvement in computer-related technology (e.g., by allowing computing devices to produce more accurate determinations of plant health, soil moisture levels, and/or algae or other floating vegetation locations at a site; and/or by avoiding deficiencies of conventional systems, which results in a reduction in the amount of computing resources needed to process image data and/or a reduction in the image processing time) using specific techniques that are not used and cannot be used by humans, who instead rely on subjective determinations in estimating plant health, soil moisture levels, and/or algae or other floating vegetation locations.

While the primary use case for the land analysis system described herein is monitoring of habitat restoration at a site, this is merely for illustrative purposes and is not meant to be limiting. Given that organic and inorganic matter may be characterized by the amount of infrared or near-infrared energy reflected by such matter, the techniques described herein as being implemented by the land analysis system can be applied to other diverse use cases. For example, the techniques described herein can be implemented for determining current plant growth and/or predicting future plant growth (e.g., in a manner as performed by the plant growth prediction system described in '455 patent incorporated by reference herein), inspecting golf courses (e.g., determining grass/plant health, determining soil moisture levels, determining current and/or predicting future grass/plant growth, etc.), water management (e.g., the NDVI image pixel color values of soil may change as the water table rises and falls, so the techniques described herein can be used to evaluate water table levels; evaluating the surface area covered by a body of water over time for flood management purposes, for irrigation purposes, etc.; etc.), inspecting trees (e.g., determining current levels of and/or predicting future levels of the amount of cover or shade provided by trees, determining current and/or predicting future tree health given that the chlorophyll image pixel color values change as trees dry out and/or die, etc.), monitoring animals (e.g., determining animal health, determining current and/or predicting future bird counts, determining current and/or predicting future endangered species counts, etc.), monitoring invasive species (e.g., determining current and/or predicting future health and/or growth of plants in a certain strata), mapping fire fuel (e.g., determining current and/or predicting future health and/or growth of plants susceptible to extending the life of a fire), inspecting erosion (e.g., different soil layers may correspond to different NDVI image pixel color values, so the movement or appearance of soil layers over time can be determined and/or predicted), evaluating common areas (e.g., for a homeowners association or park to determine and/or predict plant health and/or growth), inspecting mining operations (e.g., determining current and/or predicting future water movement, determining current and/or predicting future health and/or growth of reintroduced plants, etc.), landscaping (e.g., determining current and/or predicting future plant health and/or growth), monitoring a waste reclamation site (determining current and/or predicting future plant health and/or growth), monitoring vineyards (e.g., determining current and/or predicting future grapevine health and/or growth, determining current and/or predicting future invasive plant and/or animal species health and/or growth, etc.), monitoring nurseries (determining current and/or predicting future plant health and/or growth), and/or for any other use cases in which it may be beneficial to measure and/or predict plant health and/or growth.

While the present disclosure describes operations performed to identify plant material and determine plant health, this is not meant to be limiting. For example, the same or similar operations performed to identify plant material and determine plant health may also be used to identify algae, other floating vegetation, or other photosynthetic organisms and determine algae health, the health of other floating vegetation, and/or the health of other photo synthetic organisms.

The foregoing aspects and many of the attendant advantages of this disclosure will become more readily appreciated as the same become better understood by reference to the following detailed description, when taken in conjunction with the accompanying drawings.

Example Plant Health Detection Environment

FIG. 1 is a block diagram of an illustrative operating environment 100 in which a land analysis system 120 uses images captured by an aerial vehicle 130 to determine plant health and/or soil moisture levels. The operating environment 100 further includes various user devices 102 that may communicate with the land analysis system 120 via a network 110 to provide flight path parameters, to receive generated reports and/or scorecards, and/or to receive user interface data that, when rendered, causes a user device 102 to display a user interface in which plant health and/or soil moisture level information is depicted. In addition, the operating environment 100 may further include an irrigation system 150 and a water system 160 that can be controlled directly or indirectly by the land analysis system 120 and/or the aerial vehicle 130.

The aerial vehicle 130 may be an unmanned aerial vehicle. For example, the aerial vehicle 130 may be four or six rotor drone. Alternatively, the aerial vehicle 130 can be a manned aerial vehicle. In some embodiments, two or more unmanned aerial vehicles may be used concurrently at a given site to perform the functionality described herein with respect to a single aerial vehicle 130. The aerial vehicle 130 may include one or more cameras 132. For example, each camera 132 may be a different type of camera, such as a thermal imaging camera, a high-resolution camera (e.g., 4K, 8K, etc.) that captures images in an RGB format, an infrared camera, a near-infrared camera, a shortwave infrared camera, a multispectral camera, and/or the like. Alternatively or in addition, one camera 132 may include multiple lenses such that the camera 132 can capture different types of images. The camera(s) 132 may be mounted to a bottom and/or side surface of the aerial vehicle 130 such that the camera(s) 132 can capture images of the land underneath the aerial vehicle 130. In some embodiments, one or more of the cameras 132 are mounted to a gimbal that mounts to a bottom and/or side surface of the aerial vehicle 130 to allow for camera 132 rotation. One or more of the cameras 132 may include a network interface (e.g., a universal serial bus (USB) port, an Ethernet port, a wireless transceiver, etc.) to communicate with the land analysis system 120 via the network 110 (or via a wired or wireless point-to-point link). Alternatively, the cameras 132 may transmit data (e.g., captured images) to a network interface (e.g., a universal serial bus (USB) port, an Ethernet port, a wireless transceiver, etc., not shown) of the aerial vehicle 130 for eventual transmission to the land analysis system 120.

The aerial vehicle 130 may further include a flight path controller 138. The flight path controller 138 may communicate with the land analysis system 120 to receive flight path parameters. For example, flight path parameters may include a flight path (e.g., one or more geographic coordinates, waypoints, flight length, flight time, speed, altitude, flight course mode, a front overlap ratio (e.g., a front overlap of the defined boundaries of a capture site that is necessary for the one or more cameras 132 to fully capture the capture site, represented as a percentage), a side overlap ratio (e.g., a side overlap of the defined boundaries of a capture site that is necessary for the one or more cameras 132 to fully capture the capture site, represented as a percentage), a course angle, etc.), a shooting angle (e.g., an angle at which one or more cameras 132 is positioned to capture images), a capture mode (e.g., a setting indicating when the one or more cameras 132 capture images), a gimbal pitch angle (e.g., an angle of a lens of the one or more cameras 132), an end-mission action (e.g., hover, return to start, etc.), camera resolution, and/or the like. Alternatively, the flight path controller 138 can communicate directly with a user device 102, such as a user device 102 present at a site with the aerial vehicle 130.

In a further embodiment, the flight path controller 138 can receive flight path parameters generated based on augmented reality. For example, an aerial vehicle 130 may fly along a flight path to gather data (e.g., captured images, altitude data, etc.), transmitting the data to the land analysis system 120 in real-time (e.g., within a few seconds of when the data is captured) or near real-time. Alternatively or in addition, the aerial vehicle 130 may transmit the data to the user device 102 (directly or via the land analysis system 120) in real-time or near real-time and/or to an external system (not shown), thereby providing a live stream of a flight. For example, the external system may be a third party, network-enabled service that provides a platform for broadcasting video. A user may be able to select a platform on which the live stream is broadcast via the user device 102 and/or the land analysis system 120 (e.g., the aerial vehicle controller 121). The land analysis system 120 may process the data to identify plant health, plant strata, types of plant species, plant growth characteristics, soil moisture levels, and/or the like, and generate and transmit user interface data to a user device 102 such that a user can view the processed information in a user interface. The user interface may provide an augmented reality view, where annotations or other markings are overlaid over images depicted in the user interface in which the annotations or other markings indicate plant health, plant strata, types of plant species, plant growth characteristics, soil moisture levels, etc. The user could use the augmented reality view to set and/or adjust flight path parameters to, for example, cause the aerial vehicle 130 to travel, in real-time, to an area of interest (e.g., an area in which plants are healthy or unhealthy, an area in which unusual growth is occurring, an area in which an unknown object appears, an area in which an animal appears to be present, etc.). Alternatively, the land analysis system 120 itself could identify areas of interest based on the augmented reality view, and set and/or adjust flight parameters accordingly to modify the flight path of the aerial vehicle 130 in real-time.

Upon receiving flight path parameters, the flight path controller 138 can control the operation of the aerial vehicle 130 according to the flight path parameters. For example, the flight path controller 138 can transmit instructions to various components of the aerial vehicle 130 to cause the aerial vehicle 130 to take off from a current location, follow a certain flight path, instruct the camera(s) 132 to capture images at the appropriate time and at the appropriate angle, and land once the flight is complete. Commercially available drones, such as the DJI PHANTOM 3 or INSPIRE 1 PRO unmanned aerial vehicles, and associated code (e.g., such as the live view application provided with the DJI PHANTOM 3 unmanned aerial vehicle) may provide such features. In some embodiments, the land analysis system 120 can transmit updated flight path parameters to the flight path controller 138 while the aerial vehicle 130 is in flight. When updated flight path parameters are received in flight, the flight path controller 138 can transmit instructions to various components of the aerial vehicle 130 to cause the aerial vehicle 130 to adjust flight according to the updated flight path parameters.

The flight path controller 138 may further include instructions that, when executed, cause the aerial vehicle 130 to deviate from the selected flight path at the instruction of a user and/or automatically. For example, as described below, the aerial vehicle 130 can transmit captured images in real-time (as the images are captured) to the land analysis system 120. The land analysis system 120 (e.g., the AI-based image processor 122 and/or the plant health identifier 124 described below) may provide one or more user devices 102 with access to the captured images as they are received during a flight. For example, the land analysis system 120 (e.g., the user interface generator 131 described below) may generate user interface data that is transmitted to a user device 102 and that causes the user device 102 to display a user interface showing the images as the images are captured by the one or more cameras 132. A user viewing the user interface and captured images may notice an object of interest and can use controls provided by the user interface to transmit instructions to the aerial vehicle 130 via the land analysis system 120 that cause the aerial vehicle 130 to return to the location where the object of interest was noticed. As another example, the land analysis system 120 (e.g., the AI-based image processor 122 and/or the plant health identifier 124) and/or the flight path controller 138 can be configured to process captured images as the camera (s) 132 captures such images to identify certain objects and, if such objects are identified, instruct the aerial vehicle 130 or otherwise cause the aerial vehicle 130 to deviate from the flight path to revisit the identified object (e.g., to capture additional images). The land analysis system 120 and/or flight path controller 138 can use data indicating the shape, NDVI color value, and/or chlorophyll color value of specific objects to process a captured image and determine whether an object with the same shape, NDVI color value, and/or chlorophyll color value is present. Note that the flight path controller 138 may intercept and/or receive images captured by the camera(s) 132 in order to perform the processing.

Optionally, the aerial vehicle 130 includes a speaker 134 and/or microphone 136. For example, the aerial vehicle 130 may be instructed to capture images for the purpose of monitoring an animal population (e.g., birds, rodents, deer, endangered species, etc.). The speaker 134 may output a sound that resembles a sound produced by the subject animal species (e.g., a bird call). The microphone 136 may be enabled to listen for sounds that are produced in response to the sound output by the speaker 134. The aerial vehicle 130 can transmit the sounds picked up by the microphone 136 along with the geographic coordinates at which the sounds were received to the land analysis system 120 for analysis, and/or can record such information for later retrieval and analysis. In particular, the land analysis system 120 may store a mapping of sounds to specific animal species. Thus, the land analysis system 120 can process the received sounds to identify whether the sounds resemble sounds associated with a known animal species. If a match occurs, then the land analysis system 120 can determine that at least one animal of the animal species was present in the vicinity of a location at which the sound was picked up by the microphone 136. This audio processing can supplement the image processing described herein to provide a more accurate determination of a current animal population and/or a more accurate prediction of a future animal population. In addition, the audio data may help the land analysis system 120 provide accurate determinations of a current animal population and/or accurate predictions of a future animal population even if the particular animal species is not visible in the captured images.

Optionally, the aerial vehicle 130 includes an altimeter 137. The altimeter 137 can measure the altitude of the aerial vehicle 130. The altimeter 137 can also use RADAR, LIDAR, SONAR, and/or the like (in which the altimeter 137 signal emission and/or reception component is positioned toward the ground below the aerial vehicle 130) to measure a distance between a location of the altimeter 137 and the highest point of an object below the aerial vehicle 130. The altimeter 137 can measure the altitude of the aerial vehicle 130 and/or the distance between the aerial vehicle 130 and an object below the aerial vehicle 130 at varying resolutions, such as at each geographic location that may correspond to a pixel in an image captured by the camera 132, each time the camera 132 captures an image, etc.

Optionally, the aerial vehicle 130 includes an irrigation controller 139. As described in greater detail below, the irrigation controller 139 can communicate with the irrigation system 150 and/or the water system 160 via the network 110 to control valves 154 and/or 164, turn on and/or off sprinkler heads 156, and/or the like.

In further embodiments, not shown, the aerial vehicle 130 includes a mechanical and/or pneumatic attachment (e.g., a mechanical and/or pneumatic arm) configured to obtain and hold items, collect samples, and/or the like. During flight, the aerial vehicle 130 can use the mechanical attachment to perform such actions and record, using the current geographic coordinates of the aerial vehicle 130, a location at which such actions were performed. The location information may then be used to annotate images to indicate a location where an action was performed.

In further embodiments, the aerial vehicle 130 may include sensors, not shown, to perform obstacle avoidance. For example, the aerial vehicle 130 may be flying at a low altitude (e.g., 8-9 meters). Tree branches, terrain, and/or other objects may therefore impede the flight path of the aerial vehicle 130. The aerial vehicles 130 (e.g., the flight path controller 138) can therefore use the sensors to detect objects to the front and/or side of the aerial vehicle 130, adjust a flight path of the aerial vehicle 130 to avoid the detected objects, and then return to the flight path set by the flight path parameters once the aerial vehicle 130 is clear of the detected objects.

The land analysis system 120 can be a computing system with a specialized wireless transceiver that can be used to communicate with the aerial vehicle 130 that is configured to periodically instruct the aerial vehicle 130 to capture images and measure altitude data (e.g., an altitude of the aerial vehicle 130 and/or a distance between the aerial vehicle 130 and an object below the aerial vehicle 130) along a flight path above a site and use the captured images and data to determine plant health, soil moisture levels, and/or algae or other floating vegetation locations at the site. For example, the land analysis system 120 may be a single computing device, or it may include multiple distinct computing devices, such as computer servers, logically or physically grouped together to collectively operate as a server system, or independent components or devices that are or are not networked together, but that are used in combination to perform the operations described herein. As an illustrative example, one computing device in the land analysis system 120 may perform the operations described below with respect to aerial vehicle controller 121, while another, separate computing device in the land analysis system 120 may perform the operations described below with respect to the plant health identifier 124. The components of the land analysis system 120 can each be implemented in application-specific hardware (e.g., a server computing device with one or more ASICs) such that no software is necessary, or as a combination of hardware and software. In addition, the modules and components of the land analysis system 120 can be combined on one server computing device or separated individually or into groups on several server computing devices. In some embodiments, the land analysis system 120 may include additional or fewer components than illustrated in FIG. 1.

In some embodiments, the features and services provided by the land analysis system 120 may be implemented as web services consumable via the communication network 110. In further embodiments, the land analysis system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The land analysis system 120 may include various modules, components, data stores, and/or the like to provide the plant health, soil moisture level detection, and algae or other floating vegetation detection functionality described herein. For example, the land analysis system 120 may include an aerial vehicle controller 121, an AI-based image processor 122, a plant strata identifier 123, a plant health identifier 124, a flight path data store 125, an image data store 126, a shape file data store 127, and a user interface generator 131.

The aerial vehicle controller 121 may receive flight path parameters from the user device 102 via the network 110. Alternatively, a user can provide the aerial vehicle controller 121 with flight path parameters by interacting directly with the land analysis system 120. In an embodiment, the user device 102 sets the flight path such that the aerial vehicle 130 captures images and/or altitude data covering an entire site. As described in greater detail below with respect to FIGS. 7A-7B, the user device 102 may present a user interface that allows a user to visually set the flight path and one or more flight path parameters. The user device 102 may additional provide the aerial vehicle controller 121 with a set of times or phases at which the aerial vehicle 130 should conduct flights. For example, the user device 102 may indicate that a first flight should occur before any impact to the site has occurred, a second flight should occur once impact to the site has commenced (e.g., a portion of the site is under construction, plant material has been removed, surface lines have been installed, trenches have been dug, etc.), a third flight should occur once plants are being installed, a fourth flight should occur as plant material begins to mature, and/or any times after the plant material has begun to mature. Time intervals between flights may be in the minutes, hours, days, weeks, months, years, etc. In an embodiment, the aerial vehicle controller 121 stores the flight path parameters in the flight path data store 125 in an entry associated with the site such that the flight path parameters can be retrieved and reused for each subsequent flight (e.g., each flight may occur according to the same flight path parameters).

Once the aerial vehicle controller 121 determines that the aerial vehicle 130 should conduct a flight at a current time, a project member may bring the aerial vehicle 130 to the site (e.g., based on a reminder provided by the land analysis system 120). The aerial vehicle controller 121 can transmit the flight path parameters to the aerial vehicle 130 over the network 110 and instruct the aerial vehicle 130 (e.g., the flight path controller 138) to begin the flight. The aerial vehicle 130 (e.g., the flight path controller 138) may communicate with a satellite system (e.g., a GPS system) and/or terrestrial system to fly according to the received flight path parameters. As the aerial vehicle 130 travels along the indicated flight path, the aerial vehicle 130 captures images of the land underneath the aerial vehicle 130 at an interval determined by the capture mode and in a manner determined by the shooting angle and/or the gimbal pitch angle using the one or more cameras 132. In addition, as the aerial vehicle 130 travels along the indicated flight path, the aerial vehicle 130 measures altitude data at an interval determined by the resolution of the captured images (e.g., at each geographic coordinate corresponding to a pixel in a captured image), at an interval determined by the capture mode, etc. For example, the one or more cameras 132 can capture images directly underneath the aerial vehicle 130 (e.g., the camera (s) 132 may be positioned such that a lens is approximately parallel with the land on an axis perpendicular with the land, facing straight down) and/or at an angle (e.g., the camera(s) 132 may be positioned such that a lens deviates from being parallel with the land by a certain angle). Similarly, the altimeter 137 may be positioned such that emitters and/or receivers used to determine a distance between the aerial vehicle 130 and an object below the aerial vehicle 130 are approximately parallel with the land, facing straight down. The camera(s) 132, altimeter 137, and/or a network interface (not shown) may transmit captured images and/or measured altimeter data to the AI-based image processor 122, the plant strata identifier 123, and/or the plant health identifier 124 in real-time (as the images are captured and/or altimeter data is measured) and/or after the flight is complete.

The AI-based image processor 122 may stitch the received images together to form a single stitched image. For example, the aerial vehicle 130 may transmit or capture metadata associated with each image. The metadata may indicate portions of the image (e.g., the boundaries of the image, edges of the image, vertices of the image, individual pixels within the image, etc.) that correspond to particular geographic coordinates (e.g., as determined by the aerial vehicle 130 via communications with the GPS system). The AI-based image processor 122 can stitch the received images using the geographic coordinates provided in the metadata as a guide. For example, the AI-based image processor 122 can append an edge of one image to an edge of another image if the edges each correspond to the same geographic coordinate or range of geographic coordinates. As another example, the AI-based image processor 122 can append an edge of one image to a portion of another image if the edge and portion each correspond to the same geographic coordinate or range of geographic coordinates. As described above, the flight path may be set such that the aerial vehicle 130 captures images covering an entire site. Thus, the stitched image may be an image that captures an entire site.

If the aerial vehicle 130 includes different types of cameras 132 or a single camera 132 that captures multiples types of images (such as a multispectral camera), then the AI-based image processor 122 can segregate images corresponding to a particular type of camera 132 (or a particular type of image) and stitch together those images that originated from a particular type of camera 132 (or that correspond to a particular type of image). Thus, the AI-based image processor 122 may form multiple stitched images. As an illustrative example, the AI-based image processor 122 can form an RGB stitched image, a chlorophyll stitched image, a NIR stitched image, a SWIR stitched image, and an NDVI stitched image.

A site may include not only plant material, but also other objects, such as animals, buildings, streets, sidewalks, rivers, lakes, reservoirs, seas, oceans, barren land (e.g., soil or dirt), and/or the like. Thus, the images captured by the camera(s) 132 may depict other objects in addition to plant material. As explained above, the altitude data may include an indication of a distance between the aerial vehicle 130 and an object below the aerial vehicle 130. However, the altitude data may not include an indication of what type of object was present below the aerial vehicle 130. Thus, AI-based image processor 122 may process the RGB stitched image to identify portions of the image that correspond to plant material so that the plant strata identifier 123 can determine whether a portion of the RGB stitched image corresponds to a plant of a certain height or another object of a certain height, and/or so that the plant health identifier 124 can determine whether a portion of the RGB stitched image corresponds to a plant with a certain health or another object that reflects near-infrared and/or visible light.

For example, to identify pixels (and therefore geographic coordinates) that correspond to plant material, the AI-based image processor 122 can use artificial intelligence (e.g., machine learning, neural networks, etc.). The AI-based image processor 122 (or another system) may have previously trained a machine learning model to identify plant material in images. The AI-based image processor 122 (or other system) may implement supervised and/or unsupervised learning techniques to train the machine learning model. In one example, the AI-based image processor 122 (or other system) may obtain a set of training data in which various images are annotated to identify portions in which plant material is depicted and/or portions in which plant material is not depicted (e.g., portions in which other objects are depicted). The AI-based image processor 122 can then train the machine learning model using the set of training data.

Once the RGB stitched image is obtained, the AI-based image processor 122 can provide the RGB stitched image as an input to the machine learning model. As a result, the machine learning model may produce an output, where the output includes an indication of pixels in the RGB stitched image likely corresponding to plant material. Because each pixel may correspond to a geographic coordinate, the AI-based image processor 122 can then use the outputted pixels to identify the geographic coordinates at which plant material may be present. The AI-based image processor 122 can provide an indication of the outputted pixels and/or the geographic coordinates to the plant strata identifier 123 and the plant health identifier 124. The AI-based image processor 122 can also generate a shape file (e.g., a file that links data with geographic coordinates such that the data and geographic coordinates can be displayed in association with each other) or modify an existing shape file of a site to include an RGB stitched image of the site and/or an indication of geographic coordinates at which plant material may be present.

In other embodiments, the AI-based image processor 122 can train one or more convolutional neural networks (CNNs) to identify plant material in images. For example, each trained CNN may be trained to identify a particular type of plant. The AI-based image processor 122 can train a CNN that uses an R-CNN algorithm, a Fast R-CNN algorithm, or a Faster R-CNN algorithm. In one embodiment, the AI-based image processor 122 can train a CNN that uses a Faster R-CNN algorithm that has been modified to include additional region of interest (ROI) pooling layers and additional fully connected layers. As part of the process to train a CNN associated with a first type of plant, the AI-based image processor 122 can train a region proposal network (RPN) layer using one or more training images, such as training images that depict the first type of plant. In particular, the training images can each be annotated (e.g., automatically by the AI-based image processor 122) to include one or more bounding boxes (e.g., rectangles) that outline at least a portion of the first type of plant. The RPN layer can be trained to predict region proposals in an image applied as an input to the CNN. In addition, the AI-based image processor 122 can train a detection network (described below) as part of the process of training the CNN.

The AI-based image processor 122 can train the CNN to include three or more neural networks. For example, the trained CNN can include a feature network, the RPN, and a detection network. The feature network can be an image classification network that outputs features of an image applied as an input to the CNN. The RPN may include a plurality of convolutional layers. As an illustrative example, the RPN may include three convolutional layers, where a first layer (e.g., an ROI pooling layer) is used for classifying objects in an image applied as an input to the CNN, a second layer is used for determining coordinates of one or more bounding boxes that outline at least a portion of an object (e.g., a particular type of plant) depicted in an image applied as an input to the CNN, and a common layer that feeds data into the first two layers. The detection network can receive input from the feature network and the RPN and output a final classification and bounding box (e.g., a final indication of the type of plant detected in the image and an outline of a location of the plant in the image). The detection network may include one or more fully connected layers to perform the final classification and generate the final bounding. Typical Faster R-CNNs may include a first number of ROI pooling layers and a second number of fully connected layers. However, the CNNs trained by the AI-based image processor 122 may include a third number of ROI pooling layers that is higher than the first number and/or a fourth number of fully connected layers that is higher than the second number to increase the accuracy of the trained CNNs.

Once the RGB stitched image is obtained, the AI-based image processor 122 can perform a segmentation operation to segment the RGB stitched image. For example, the AI-based image processor 122 can segment the RGB stitched image into various image segments that each depict one or more objects. The image segments, therefore, may not result in the complete RGB stitched image if merged together given that some portions of the RGB stitched image may not depict any objects. In an embodiment, the AI-based image processor 122 uses a version of the pixel-wise semantic segmentation deep neural network (e.g., ENet semantic segmentation deep neural network) modified to include more downsampling and/or upsampling layers than a traditional pixel-wise semantic segmentation deep neural network to segment the RGB stitched image (e.g., 4 downsampling layers rather than the 3 downsampling layers present in a traditional pixel-wise semantic segmentation deep neural network, 4 upsampling layers rather than the 3 upsampling layers present in a traditional pixel-wise semantic segmentation, etc.). Optionally, the AI-based image processor 122 can store the segmentation data (e.g., the image segments that each depict one or more objects) in a data structure, such as an array data structure.

Before, during, and/or after the AI-based image processor 122 segments the RGB stitched image, the AI-based image processor 122 can provide the RGB stitched image as an input to one or more of the trained CNNs. As a result, a CNN executed by the AI-based image processor 122 that receives the RGB stitched image as an input can perform a bound-box analysis, outputting the coordinates of one or more bounding boxes in the RGB stitched image and/or classifications of object(s) outlined by the bounding box(es). Optionally, the AI-based image processor 122 can store the bounding-box data (e.g., coordinates of one or more bounding boxes in the RGB stitched image and/or classifications of object(s) outlined by the bounding box(es)) in a data structure, such as the array data structure that includes the segmentation data.

The AI-based image processor 122 can then obtain the pixel values of the pixels that fall within the bounding box(es) to determine a possible range of pixel values that correspond to the type of plant that the CNN from which the bounding-box data is obtained is trained to identify. For example, the AI-based image processor 122 can determine the number of times a particular pixel value is present within the bounding box(es), rank the pixel values from most-frequent to least-frequent, and set the possible range of pixel values to be from the most-frequent pixel value to the Xth most-frequency pixel value, where X can be 5, 10, 15, 20, etc. As another example, the AI-based image processor 122 can determine the average pixel value of the pixels present within the bounding box(es) and set the possible range of pixel values to include pixel values that are some percentage above or below the average pixel value. The AI-based image processor 122 can further compare the pixels falling within the bounding box(es) to the pixels falling within the image segments, filtering out any pixels falling within the bounding box(es) that are not also pixels falling within an image segment and filtering out any pixels falling within the image segments that are not also pixels falling within a bounding box. In other words, the AI-based image processor 122 can determine which pixels of the RGB stitched image are located within a bounding box and have been segmented into an image segment, optionally deleting from the data structure any pixels, bounding boxes, and/or image segments that do not meet this criterion. Finally, the AI-based image processor 122 can take the possible range of pixel values and identify which of the remaining image segments (e.g., the image segments that have at least one pixel that has not been filtered or deleted, the image segments in which all of the pixels have not been filtered or deleted, etc.) have some or all of their pixel values falling within the possible range of pixel values. The portion(s) (e.g., pixel(s)) of the RGB stitched image (e.g., the image segment(s)) that the AI-based image processor 122 identifies as having pixel values falling within the possible range of pixel values may be annotated or otherwise marked to indicate that the portion(s) correspond to the type of plant that the CNN from which the bounding-box data is obtained is trained to identify. For example, the AI-based image processor 122 can outline the object(s) depicted in the image segment(s) that have some or all of their pixels falling within the possible range of pixel values, indicating that such object(s) are likely the type of plant that the CNN from which the bounding-box data is obtained is trained to identify.

Because the AI-based image processor 122 can use multiple CNNs, such as one for a different type of plant, the AI-based image processor 122 can produce multiple results (e.g., multiple identifications of possible plant material). The AI-based image processor 122 can assign confidence scores to the results (e.g., based on a confidence level associated with an output of the respective CNN) and select one of the top confidence-scored results as the final result.

Because the pixels of the RGB stitched image are associated with geographic coordinates, the AI-based image processor 122 can provide an indication of the annotated or otherwise marked pixels and/or the geographic coordinates to the plant strata identifier 123 and the plant health identifier 124. The AI-based image processor 122 can also generate a shape file (e.g., a file that links data with geographic coordinates such that the data and geographic coordinates can be displayed in association with each other) or modify an existing shape file of a site to include an RGB stitched image of the site and/or an indication of geographic coordinates at which plant material may be present. Optionally, the AI-based image processor 122 can include in the shape file statistical information, such as a summary of the acreage totals occupied by the plant material and/or other ratios.

In some embodiments, the AI-based image processor 122 can detect algae or other floating vegetation in a body of water, such as a lake, river, reservoir, sea, ocean, etc. For example, the AI-based image processor 122 can obtain an NIR stitched image and an RGB stitched image, and use the NIR stitched image and the RGB stitched image to calculate, for some or all of the geographic coordinates captured in the stitched images, a blue channel version of the NDVI that depicts a comparison of a reflectance of blue visible light (instead of red visible light) with a reflectance of near-infrared light. For example, the AI-based image processor 122 can use the following formula to calculate the blue channel NDVI value at geographic coordinate x:

$$NDVI_{B,x} = \frac{NIR_x - RGB_{Blue,x}}{NIR_x + RGB_{Blue,x}} \quad (1)$$

where $NIR_x$ represents the reflectance of near-infrared light at geographic coordinate x as determined by obtaining the pixel value of the pixel in the NIR stitched image that corresponds to geographic coordinate x, and where $RGB_{Blue, x}$ represents the blue channel value at geographic coordinate x as determined by obtaining the blue channel value of the pixel in the RGB stitched image that corresponds to geographic coordinate x. The AI-based image processor 122 can then determine a median value (or mean value, mode value, etc.) of some or all of the blue channel NDVI values corresponding to the geographic coordinates captured in the stitched images, and set this value as a threshold value. The AI-based image processor 122 can then parse the blue channel NDVI values and classify each pixel (or geographic coordinate) corresponding to a blue channel NDVI value that is greater than the threshold value as "algae" or "floating vegetation" and classify each pixel (or geographic coordinate) corresponding to a blue channel NDVI value that is less than or equal to the threshold value as "non-algae" or "not floating vegetation."

As another example, the AI-based image processor 122 can obtain an NIR stitched image, an RGB stitched image, and a SWIR stitched image, and use the image to determine, for each pixel (e.g., for some or all of the geographic coordinates captured in the stitched images), an FAI that represents a difference between a Rayleigh-corrected reflectance of the NIR channel and a ratio between a linear interpolation between the red channel of the RGB band and the SWIR band. In other words, the FAI represents a difference between a Rayleight corrected reflectance of the NIR channel and a baseline between the reflectance in the red channel and the SWIR channel. For example, the AI-based image processor 122 can use the following formula to calculate the FAI at geographic coordinate x:

$$FAI_x = R_{rc,x}^{NIR} - \left[ \frac{R_{rc,x}^{RED}(\lambda_{NIR} - \lambda_{SWIR}) + R_{rc,x}^{SWIR}(\lambda_{RED} - \lambda_{NIR})}{(\lambda_{RED} - \lambda_{SWIR})} \right] \quad (2)$$

where $R_{rc,x}^{NIR}$ represents the Rayleigh-corrected reflectance of near-infrared light at geographic coordinate x as determined by obtaining the pixel value of the pixel in the NIR stitched image that corresponds to geographic coordinate x and correcting the pixel value using the Rayleigh correction scheme, where $R_{rc,x}^{RED}$ represents the Rayleigh-corrected red channel value at geographic coordinate x as determined by obtaining the red channel value of the pixel in the RGB stitched image that corresponds to geographic coordinate x and correcting the pixel value using the Rayleigh correction scheme, where $R_{rc,x}^{SWIR}$ represents the Rayleigh-corrected shortwave infrared light at geographic coordinate x as determined by obtaining the SWIR value of the pixel in the SWIR stitched image that corresponds to geographic coordinate x and correcting the pixel value using the Rayleigh correction scheme, where $\lambda_{NIR}$ is the central wavelength in the NIR band, where $\lambda_{SWIR}$ is the central wavelength in the SWIR band, and where $\lambda_{RED}$ is the central wavelength in the RGB red band. The AI-based image processor 122 can then parse the FAI values corresponding to the geographic coordinates captured in the stitched images and classify each pixel (or geographic coordinate) corresponding to an FAI value above 0 and/or a Rayleigh-corrected red channel value less than a threshold (e.g., 0.08) as "algae" or "floating vegetation" and classify each pixel (or geographic coordinate) corresponding to an FAI value equal to or less than 0 and/or a Rayleigh-corrected red channel value greater than or equal to a threshold (e.g., 0.08) as "non-algae" or "not floating vegetation."

Thus, the AI-based image processor 122 can determine that the geographic locations corresponding to pixels classified as "algae" or "floating vegetation" are geographic locations in which algae or other floating vegetation is present. The plant health identifier 124 can optionally determine the health of detected algae or other floating vegetation using the techniques described herein. The AI-based image processor 122, the plant strata identifier 123, and/or the plant health identifier 124 can package the algae detection data (e.g., geographic locations at which algae or other floating vegetation is detected) into a report and/or scorecard (e.g., where the scorecard indicates scores for various tasks associated with increasing and/or decreasing algae or other floating vegetation levels) and transmit the report and/or scorecard to a user device 102 (e.g., either the same user device 102 that provided the flight path parameters or a different user device 102). In addition, the user interface generator 131 can generate user interface data that, when rendered by a user device 102, causes the user device 102 to display a user interface in which the site (e.g., the RGB stitched image) and the location of algae or other floating vegetation are depicted.

The plant strata identifier 123 can use the indication of outputted pixels and/or geographic coordinates and the altitude data to identify the strata of plant material present at the site. As explained above, the altitude data may indicate both an altitude of the aerial vehicle 130 at a particular geographic coordinate and a distance between the aerial vehicle 130 and an object below the aerial vehicle 130 at a particular geographic coordinate. Separately, the plant strata identifier 123 can obtain topography data from an external data store (not shown), in which the topography data includes an indication of an elevation of terrain at various geographic coordinates. For some or all of the geographic coordinates at which the AI-based image processor 122 identified plant material, the plant strata identifier 123 can obtain topography data of the respective geographic coordinate, obtain the distance between the aerial vehicle 130 and the plant material below the aerial vehicle 130 at the respective geographic coordinate, obtain the altitude of the aerial vehicle 130 at the respective geographic coordinate, and subtract the distance between the aerial vehicle 130 and the plant material below the aerial vehicle 130 from the altitude of the aerial vehicle 130 to obtain a height of the plant material with respect to sea level. The plant strata identifier 123 can then subtract the elevation of the terrain at the respective geographic coordinate from the height of the plant material with respect to sea level to obtain a height of the plant material itself at the respective geographic coordinate. The plant strata identifier 123 can compare the obtained height to the height values defining the different strata to identify to which strata the plant material belongs. The plant strata identifier 123 can modify the shape file for the site, including an indication of the strata of plants at geographic coordinates in which the AI-based image processor 122 determines that plants may be present at the site.

The plant health identifier 124 can use the indication of outputted pixels and/or geographic coordinates to determine the health of the plants or algae or other floating vegetation at the corresponding geographic coordinates. For example, the chlorophyll stitched image may identify plant health, and the plant health identifier 124 can use the geographic coordinates received from the AI-based image processor 122 and/or geographic coordinates determined by identifying geographic coordinates corresponding to pixels received from the AI-based image processor 122 to identify portions (e.g., pixels) of the chlorophyll stitched image that correspond to plant (or algae) material. Once the pixels are identified, the plant health identifier 124 can analyze the colors of these pixels to determine a health of the plant species corresponding to the respective pixels.

For example, each pixel in the chlorophyll stitched image may have an RGB color represented by a red value, a green value, and a blue value. For each pixel, the plant health identifier 124 can identify the green value of the RGB color. The green value of the RGB color may indicate a relative health of a plant (e.g., because the green value represents an amount of chlorophyll in the plant, where more chlorophyll indicates a healthier plant). Based on the magnitude of the green value, the plant health identifier 124 can optionally assign another RGB color to the pixel and convert the pixel from the original RGB color to the newly assigned RGB color. In an embodiment, the assigned RGB color may be a color within a color spectrum between red (e.g., RGB hexadecimal color #FF0000) and green (e.g., RGB hexadecimal color #00FF00), where orange (e.g., RGB hexadecimal color #FFA500) represents a middle color between red and green in the color spectrum. The higher the original green value of the pixel, the closer the newly assigned RGB color will be to green (e.g., RGB hexadecimal color #00FF00) and the farther the newly assigned RGB color will be from red (e.g., RGB hexadecimal color #FF0000). As an illustrative embodiment, if the original RGB color of the pixel is RGB hexadecimal color #340067, then the newly assigned RGB color may be RGB hexadecimal color #FF0000. If the original RGB color of the pixel is RGB hexadecimal color #1EFFB0, then the newly assigned RGB color may be RGB hexadecimal color #00FF00. The plant health identifier 124 can use other similar techniques, such as visible atmospherically resistant index (VARI) or NDVI, to convert the pixels of the chlorophyll stitched image. In some embodiments, the plant health identifier 124 converts pixels of the chlorophyll stitched image that correspond to geographic coordinates in which plant material (and/or algae material) may be present. Thus, the plant health identifier 124 may normalize the RGB color of some or all of the pixels of the chlorophyll stitched image to an RGB color within the color spectrum described above. By normalizing the RGB color of some or all of the pixels of the chlorophyll stitched image, the plant health identifier 124 may produce a converted image that visually indicates plant health and/or a chemical composition of various plants (e.g., chlorophyll levels of a plant, nitrogen levels of a plant, etc.).

Alternatively, the plant health identifier 124 can transmit the chlorophyll stitched image to an external system (not shown) and the external system can process the chlorophyll stitched image to convert the pixels using the same or a similar process. The external system can then transmit the converted image to the plant health identifier 124.

The chlorophyll stitched image with converted pixels may be referred to as a plant health image. Depending on the value of a converted pixel, a plant may be considered very healthy (e.g., bright green), healthy (e.g., light green), partially healthy (e.g., orange), unhealthy (e.g., light red), very unhealthy (bright red), etc. The plant health identifier 124 can modify the shape file of the site to include an indication of the relative health of plants at the various geographic coordinates at which plants may be present (e.g., a health category, such as very healthy, healthy, partially healthy, unhealthy, very unhealthy, etc.; a plant health image pixel color; and/or any combination thereof).

Thus, the shape file of a site may include an RGB stitched image of the site, where the image may be annotated to indicate locations where plants may be present, the strata of such plants, and the health of such plants. Alternatively, the image may not be annotated within the shape file, but the shape file, when a user device 102 attempts to open or display the shape file, may cause the user device 102 to overlay the plant location, strata, and/or health over the RGB stitched image or to display such information adjacent to the RGB stitched image. The land analysis system 120 may further modify the shape file of the site to include other information described herein, such as the area of the site covered by various plant species in particular strata, the percentage of a site covered by plant species in a particular strata, etc. The plant health identifier 124, the AI-based image processor 122, and/or the plant strata identifier 123 can store the shape file in the shape file data store 127 in an entry associated with the site. A user device 102 can then retrieve the shape file from the shape file data store 127 to display the shape file in a user interface.

The AI-based image processor 122, the plant strata identifier 123, and/or the plant health identifier 124 can package the plant location, plant strata, and/or plant health data into a report and/or scorecard and transmit the report and/or scorecard to a user device 102 (e.g., either the same user device 102 that provided the flight path parameters or a different user device 102). As described herein, the scorecard may include raw scores, a total raw score, updated scores, and/or a total updated score for various tasks associated with maintaining plant health. The plant health identifier 124 can generate the updated scores and/or total updated score based on the plant strata and/or plant health data (e.g., if the plant health data indicates that plants in a particular strata are unhealthy, plants of a particular species are unhealthy, plants in a particular geographic region are unhealthy, etc., this may result in the generation of updated scores lower than the raw scores, where the difference between the scores may depend on the unhealthiness of the plants). In addition, the user interface generator 131 can generate user interface data that, when rendered by a user device 102, causes the user device 102 to display a user interface in which the site (e.g., the RGB stitched image), plant locations, plant strata, and/or plant health data are depicted.

The plant health identifier 124 can further process the plant health image to perform additional actions or cause the aerial vehicle 130 to perform additional actions. For example, an unhealthy plant may be any plant corresponding to one or more pixels that have a value less than a threshold value (e.g., less than RGB hexadecimal color #ADFF2F, less than RGB hexadecimal color #FFA500, etc.) within the above-described color spectrum. In some embodiments, sprinkler heads 156 of the irrigation system 150 or the irrigation system 150 itself may be located at specific geographic coordinates. Thus, the plant health identifier 124 or the irrigation controller 139 at the direction of the plant health identifier 124 can transmit a message to a controller 152 of the irrigation system 150 (or an external network-based system, not shown, that manages the irrigation system 150) via the network 110 indicating the geographic coordinates corresponding to unhealthy plants. The controller 152 may manage the activation and deactivation of valves 154 controlling the flow of water to the sprinkler heads 156 and/or may control the activation of the sprinkler heads 156 themselves using a watering schedule. Thus, receipt of the message (either from the plant health identifier 124, the aerial vehicle 130, or the external network-based system) may cause the controller 152 of the irrigation system 150 to adjust its watering schedule such that the sprinkler heads 156 corresponding to the received geographic coordinates and/or the valves 154 controlling the flow of water to the sprinkler heads 156 corresponding to the received geographic coordinates are activated more frequently, may cause the controller 152 of the irrigation system 150 to adjust its watering schedule such that the sprinkler heads 156 corresponding to the received geographic coordinates and/or the valves 154 controlling the flow of water to the sprinkler heads 156 corresponding to the received geographic coordinates are activated less frequently (e.g., in situations in which the plants are unhealthy as a result of too much watering), may cause the controller 152 of the irrigation system 150 to automatically activate at least the sprinkler heads 156 corresponding to the received geographic coordinates and/or the valves 154 controlling the flow of water to the sprinkler heads 156 corresponding to the received geographic coordinates such that the sprinkler heads 156 spray water, and/or the like. Accordingly, the processing of the plant health images performed by the plant health identifier 124 may result in an irrigation system 150 watering unhealthy plants more often (or less often).

Alternatively or in addition, the plant health identifier 124 may process the plant health image to identify the height, width, volume, area, and/or canopy percentages of plants. For example, the plant health identifier 124 can use object recognition techniques to identify individual plants (e.g., the plant health identifier 124 can identify individual plants by identifying pixels that have a similar color, such as colors that are within a threshold value of each other). Once a plant is identified, the plant health identifier 124 determines a width, volume, and/or area of the plant (e.g., based on the scale of the plant health image). For example, the plant health identifier 124 can identify a boundary of the plant based on the pixel colors (e.g., a difference in pixel colors above a threshold value indicates a boundary of the plant) to determine the width, volume, and/or area of the plant. The plant health identifier 124 can further determine a canopy percentage of the plant by measuring the area of the plant as a percentage of the total area of the site.

In addition, as the aerial vehicle 130 captures images, the aerial vehicle 130 may track an altitude of the aerial vehicle 130 (e.g., relative to the ground) and use the altimeter 137 (e.g., a RADAR detector, LIDAR detector, SONAR detector, or other similar device) to identify a distance between the aerial vehicle 130 and an object (e.g., a plant, the ground, water, etc.) below the aerial vehicle 130. As described above, at each location, the aerial vehicle 130 can subtract the identified distance from the tracked altitude to identify a height of an object below the aerial vehicle 130. Alternatively, the aerial vehicle 130 can transmit the tracked altitude and the identified distance to the plant strata identifier 123 (or another component of the land analysis system 120) and the plant strata identifier 123 (or other component of the land analysis system 120) can subtract the identified distance from the tracked altitude to identify a height of an object below the aerial vehicle 130 at various locations at provide this information to the aerial vehicle 130. In this way, the aerial vehicle 130 and/or plant strata identifier 123 can determine a height or heights (e.g., branches and leaves may be at different heights) of plants or other objects. In some embodiments, the altimeter 137 may receive multiple return signals, one of which may represent ground, and others of which may represent above-ground objects (e.g., branches, tops of trees, etc.). The altimeter 137 may be able to distinguish between these signals, treating the signal emanating from the farther distance as corresponding to a signal emanating from the ground.

In some embodiments, the aerial vehicle 130 can use the distance information to fly at a consistent altitude relative to ground. For example, the flight path controller 138 may receive instructions to fly at a certain height above ground. By flying at a consistent height above ground, the images captured by the camera 132 may be at a consistent spatial resolution at various locations within the site (e.g., a pixel captured at one part of the site may correspond to the same area as a pixel captured at another part of the site), which can increase the accuracy of the image processing performed by the AI-based image processor 122 and/or the plant health identifier 124. The flight path controller 138 can receive the distance information (e.g., from the altimeter 137) and increase the altitude of the aerial vehicle 130 if the distance is less than the instructed height above ground, decrease the altitude of the aerial vehicle 130 if the distance is greater than the instructed height above ground, or cause the aerial vehicle 130 to continue flying at the current altitude if the distance is the same as the instructed height above ground.

The AI-based image processor 122, the plant strata identifier 123, and/or the plant health identifier 124 can compare the determined height, width, volume, area, and/or canopy percentage of a plant or a group of plants within a geographic area to threshold heights, widths, volumes, areas, and/or canopy percentages to adjust lighting and/or lighting schedules, to adjust watering and/or watering schedules, and/or to identify when plants need to be pruned. For example, the AI-based image processor 122, the plant strata identifier 123, and/or the plant health identifier 124 can compare the height, width, volume, area, and/or canopy percentage of one plant (or one group of plants) against a threshold height, width, volume, area, and/or canopy percentage. If one or more of the height, width, volume, area, and/or canopy percentage values is greater than one or more of the threshold height, width, volume, area, and/or canopy percentage values by a threshold value or percentage, then this may indicate that the area beneath this plant (or group of plants) is generally dark. Thus, the AI-based image processor 122, the plant strata identifier 123, and/or the plant health identifier 124 and/or the aerial vehicle 130 at the direction of a component of the land analysis system 120 can transmit a message to a lighting system (or an external network-based system, not shown, that manages the lighting system) via the network 110 indicating the geographic coordinates of this plant (or group of plants). Receipt of the message (either from the land analysis system 120, the aerial vehicle 130, or the external network-based system) may cause the lighting system to adjust its schedule such that lights corresponding to the received geographic coordinates are activated earlier in the day and/or for a longer period of time, may cause the lighting system to automatically activate at least the lights corresponding to the received geographic coordinates, and/or the like. This process may be useful for parking lots, sidewalks, trails, paths, and/or other areas in which adequate lighting for people in such areas may be important (e.g., to increase safety). The AI-based image processor 122, the plant strata identifier 123, and/or the plant health identifier 124 may also generate a notification for transmission to a user device 102 via the network 110 (e.g., a push notification) indicating that the plant (or group of plants) need to be pruned.

Conversely, if one or more of the height, width, volume, area, and/or canopy percentage values is less than one or more of the threshold height, width, volume, area, and/or canopy percentage values by a threshold value or percentage, then this may indicate that the area beneath this plant (or group of plants) is generally light and the AI-based image processor 122, the plant strata identifier 123, and/or the plant health identifier 124 and/or the aerial vehicle 130 at the direction of a component of the land analysis system 120 can transmit no message or a message to the lighting system (or the external network-based system) to perform the opposite operation (e.g., turn on the lights later and/or for a shorter period of time, automatically turn off the lights, etc.). Thus, the processing performed by the AI-based image processor 122, the plant strata identifier 123, and/or the plant health identifier 124 can be used to conserve energy via the efficient use of lighting. The AI-based image processor 122, the plant strata identifier 123, and/or the plant health identifier 124 may also generate a notification for transmission to a user device 102 via the network 110 (e.g., a push notification) indicating that the plant (or group of plants) do not need to be pruned, the plant (or group of plants) should be pruned later than scheduled, and/or additional plants should be planted in the corresponding geographic area. In addition, as described above, the AI-based image processor 122, the plant strata identifier 123, and/or the plant health identifier 124 and/or the aerial vehicle 130 at the direction of a component of the land analysis system 120 can generate and transmit a message to cause the irrigation system 150 to water the plant (or group of plants) automatically, more frequently, and/or less frequently.

In some cases, the user interface generator 131 can generate user interface data that, when rendered by the user device 102, causes the user device 102 to display a user interface providing information on plant height, width, volume, area, and/or canopy percentage and/or tools for allowing a user to manually measure such information (alternatively or in addition to other information that may be displayed in the user interface as described herein).

The plant health identifier 124 can also detect the level of moisture in soil. For example, the AI-based image processor 122 can optionally use a machine learning model trained to identify soil and/or plant material (under which soil may be present) to identify pixels of the RGB stitched image in which soil and/or plant material is present. In one example, the training data used by the AI-based image processor 122 (or an external system, not shown) to train the machine learning model may include images annotated to identify portions in which soil is present, images annotated to identify portions in which plants are present, images annotated to identify portions in which neither soil nor plants are present, etc. The AI-based image processor 122 can provide the RGB stitched image as an input to the machine learning model, and the machine learning model can output pixels of the RGB stitched image that likely correspond to soil and/or plant material. The AI-based image processor 122 can then obtain geographic coordinates corresponding to the identified pixels.

The plant health identifier 124 can then obtain the color values of pixels in the NDVI stitched image that correspond to the geographic coordinates associated with the pixels output by the machine learning model. The plant health identifier 124 can process the color values to determine the level of moisture present in the soil at these locations. For example, the color value of a pixel in the NDVI stitched image may represent an NDVI value. The plant health identifier 124 may calculate the moisture in the soil at a particular geographic coordinate using the following equation:

$$\theta_v = \beta_c - (\beta_{NDVI} * NDVI_R) - (\beta_{LST} * LST_R) \qquad (3)$$

where $\theta_v$ is volumetric soil moisture (e.g., in centimeters cubed), $\beta_c$ is a constant beta value, $\beta_{NDVI}$ is an NDVI beta value, $NDVI_R$ is a re-scaled version of the NDVI value of the pixel at the geographic coordinate, $\beta_{LST}$ is a land surface temperature (LST) beta value, and $LST_R$ is a re-scaled LST digital number. For example, the plant health identifier 124 can rescale the NDVI value to a value between −1 and 1 by dividing the NDVI value of the pixel at the geographic coordinate by 10,000 (or another constant), and the plant health identifier 124 can rescale the LST value by converting the LST value from Kelvin to Celsius (e.g., where the LST value is obtained from an external source that measures land surface temperate at the geographic coordinate in Kelvin and/or from the aerial vehicle 130, which can measure the land surface temperature in Kelvin at the geographic coordinate using a thermostat). The plant health identifier 124 may determine the beta values by, for example, feeding some or all of the parameter values in Equation (3) into an ordinary least squares regression model. Optionally, the plant health identifier 124 can further reset all re-scaled NDVI values less than 0 to 0 and all re-scaled LST values less than 0° C. and/or above 50° C. to 0° C.

Once the soil moisture level at a particular geographic coordinate is calculated, the plant health identifier 124 can modify the shape file of the site to include an indication of the soil moisture level at the geographic coordinate. The plant health identifier 124 can repeat this process for some or all of the geographic coordinates at which soil and/or plant material is likely present. Alternatively or in addition, the plant health identifier 124 can package the soil moisture level calculation into a report and/or scorecard and transmit the report and/or scorecard to a user device 102 (e.g., either the same user device 102 that provided the flight path parameters or a different user device 102).

While the aerial vehicle controller 121, the AI-based image processor 122, the plant strata identifier 123, and the plant health identifier 124 are depicted as being located internal to the land analysis system 120, this is not meant to be limiting. For example, the aerial vehicle controller 121, the AI-based image processor 122, the plant strata identifier 123, and the plant health identifier 124 (or a component that implements at least a portion of the AI-based image processor 122, the plant strata identifier 123, and the plant health identifier 124 functionality described herein) may be internal to another computing device present at the site where the aerial vehicle 130 is located. Alternatively, the land analysis system 120 (or one or more components of the land analysis system 120) may itself be present at the site where the aerial vehicle 130 is located.

The user interface generator 131 can generate user interface data and transmit the user interface data to a user device 102. The user interface data, when rendered by the user device 102, may cause the user device to display a site, navigation controls for controlling the flight of the aerial vehicle 130, other selectable flight path parameters, plant locations, plant strata, plant health, and/or soil moisture levels. Example user interfaces that may be displayed by the user device 102 based on the user interface data generated by the user interface generator 131 are depicted in FIGS. 7A through 8C.

In further embodiments, the land analysis system 120 and/or the aerial vehicle 130 (e.g., via the irrigation controller 139) can control operation of the water system 160. For example, the water system 160 may be the water system for a municipality, state, or other geographic region. The water system 160 may include one or more pipes 162 that are controlled by one or more valves 164. The AI-based image processor 122 can process an image (e.g., a thermographic image) captured by the camera 132 to identify underground and/or above ground leaks originating from one or more of the pipes 162. As described herein, the thermographic image captures light, such as infrared light, invisible to humans. Thus, the thermographic image may depict objects present below the surface or other objects that are otherwise invisible to humans. In one example, such objects can include the flow of water below a sidewalk, below the pavement, and/or the like, that result from a leak or water main break. The AI-based image processor 122 may identify the flow of water based on comparing the shape and/or color of the pixels present in the thermographic image with known shapes and/or colors of water (e.g., the shape may be a thin and snake-like, similar to a stream or river, and the color may be within the blue color spectrum or any other color representing the wavelength of light emitted by water). The AI-based image processor 122 may further recognize one or more pipes 162 in the thermographic image (e.g., based on comparing objects in the image to known shapes and/or colors of pipes 162), thereby allowing the AI-based image processor 122 to identify the specific pipe 162 from which the water is flowing. Once the AI-based image processor 122 identifies the pipe 162 from which the water is flowing, the AI-based image processor 122 or the irrigation controller 139 at the direction of the AI-based image processor 122 can generate and transmit a message to a valve 164 corresponding to the identified pipe 162 via the network 110, where receipt of the message causes the valve 164 to shut off the flow of water through the pipe 162. Accordingly, the land analysis system 120 can automatically detect a leak and transmit instructions to cause the flow of water to stop such that the leak can be fixed.

The flight path data store 125 stores flight path parameters for various sites. While the flight path data store 125 is depicted as being located internal to the land analysis system 120, this is not meant to be limiting. For example, not shown, the flight path data store 125 can be located external to the land analysis system 120.

The image data store 126 stores images captured by the aerial vehicle 130 and/or stitched images generated by the AI-based image processor 122. The images may be stored in entries associated with a site and a time and/or flight identification identifying when the images were captured. While the image data store 126 is depicted as being located internal to the land analysis system 120, this is not meant to be limiting. For example, not shown, the image data store 126 can be located external to the land analysis system 120.

The shape file data store 127 stores shape files for various sites. While the shape file data store 127 is depicted as being located internal to the land analysis system 120, this is not meant to be limiting. For example, not shown, the shape file data store 127 can be located external to the land analysis system 120.

Example Block Diagrams for Determining Plant Health

Figure 2A:
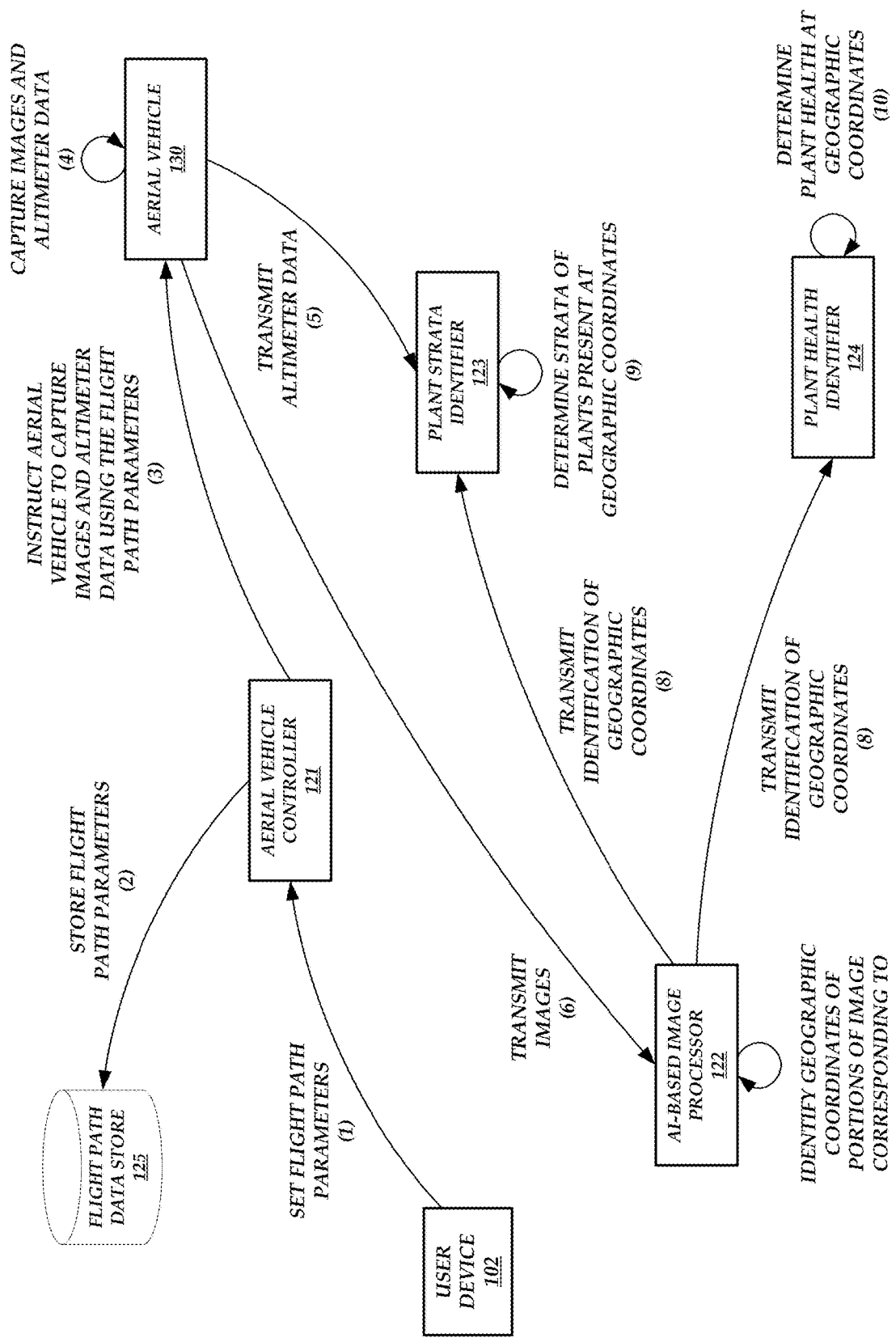
FIGS. 2A-2B are flow diagrams illustrating the operations performed by the components of the operating environment of FIG. 1 to determine plant health, according to one embodiment.
Figure 2B:
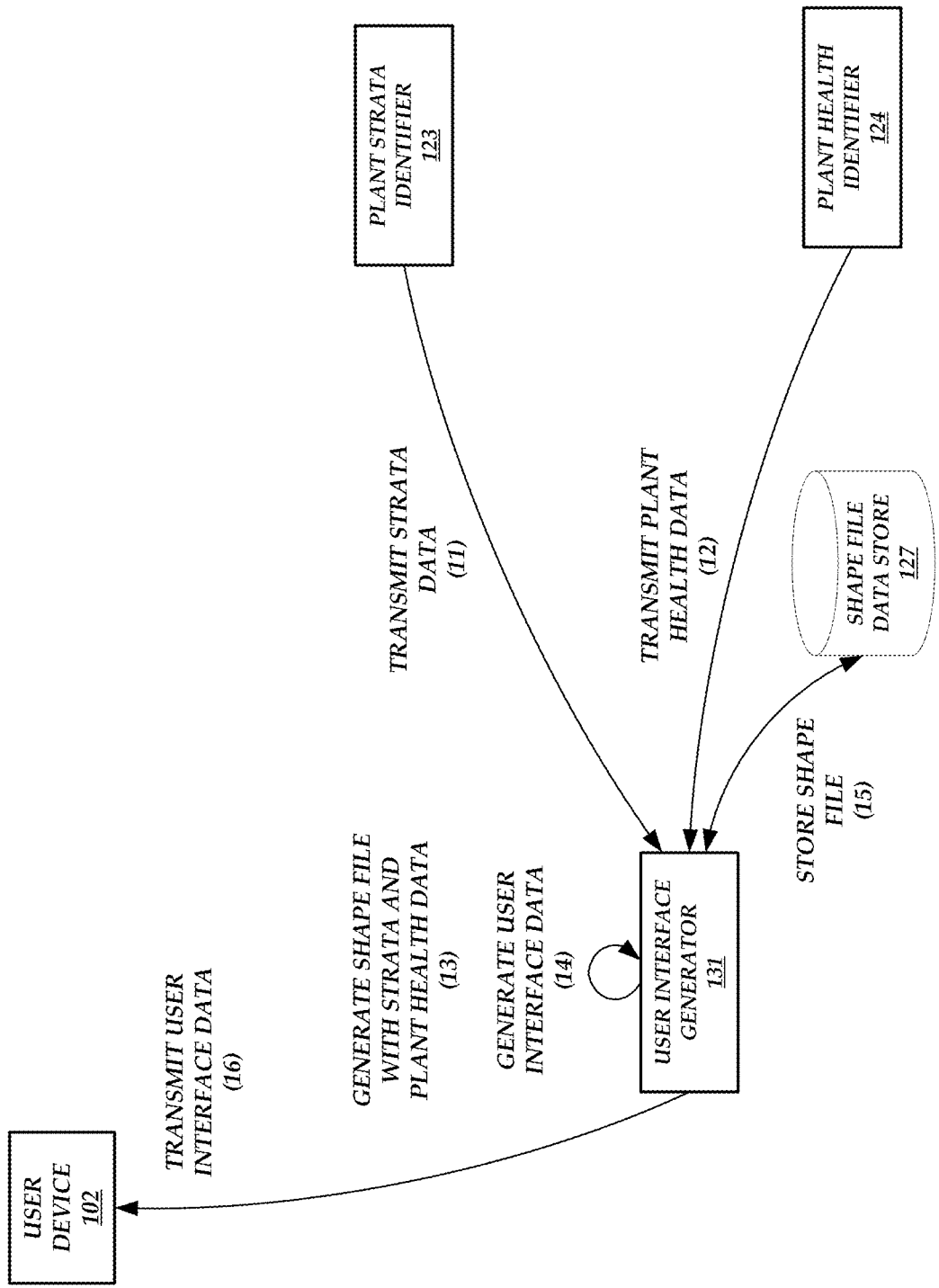

FIGS. 2A-2B are flow diagrams illustrating the operations performed by the components of the operating environment 100 of FIG. 1 to determine plant health, according to one embodiment. As illustrated in FIG. 2A, the user device 102, based on input from a user, sets flight path parameters and transmits the flight path parameters to the aerial vehicle controller 121 at (1). The aerial vehicle controller 121 may then optionally store the flight path parameters in the flight path data store 125 at (2). Before, during, or after storing the flight path parameters, the aerial vehicle controller 121 can instruct the aerial vehicle 130 at (3) to capture images and altimeter data using the flight path parameters.

In response to receiving the instruction to capture images and altimeter data, the aerial vehicle 130 can begin a flight and capture images and altimeter data at (4). As images and altimeter data are captured and/or after the flight is complete, the aerial vehicle 130 can transmit the altimeter data to the plant strata identifier 123 at (5) and the images to the AI-based image processor 122 at (6).

The captured images may include RGB images, chlorophyll images, and/or NDVI images. The AI-based image processor 122 can stitch like images together to form, for example, an RGB stitched image, a chlorophyll stitched image, and/or an NDVI stitched image. The AI-based image processor 122 can the process the RGB stitched image to identify geographic coordinates of portions of the image corresponding to plant material at (7). For example, the AI-based image processor 122 can provide the RGB stitched image as an input to a machine learning model trained to identify plant material in images. The machine learning model can output pixels likely corresponding to plant material, and the AI-based image processor 122 can identify geographic coordinates corresponding to the outputted pixels. The AI-based image processor 122 can transmit an indication of the identified geographic coordinates to the plant strata identifier 123 and/or the plant health identifier 124 at (8). The AI-based image processor 122 can also optionally generate a shape file for the site, including the indication of the identified geographic coordinates and/or the RGB stitched image in the shape file.

The plant strata identifier 123 can determine a strata of plants likely present at the geographic coordinates indicated by the AI-based image processor 122 at (9). For example the plant strata identifier 123 can use the altimeter data and/or external topography data to determine a height of objects at geographic coordinates likely to include plant material. The plant strata identifier 123 can then assign geographic coordinates to different strata based on the determined heights. The plant strata identifier 123 can optionally modify the shape file for the site to include a mapping of geographic coordinates to strata.

Before, during, or after the plant strata identifier 123 determines a strata of plants likely at the site, the plant health identifier 124 determines plant health at the geographic coordinates indicated by the AI-based image processor 122 at (10). For example, the plant health identifier 124 may obtain the chlorophyll stitched image from the AI-based image processor 122, and identify the color values of the pixels in the chlorophyll stitched image that are associated with the geographic coordinates identified by the AI-based image processor 122 as likely including plant material (where the color values represent the plant health). The plant health identifier 124 can optionally convert the pixels of the chlorophyll stitched image prior to identifying the color values. The plant health identifier 124 can also optionally modify the shape file for the site to include an indication of the plant health (e.g., the color values of the pixels, a category of health in which the pixels fall (e.g., healthy, partially healthy, unhealthy, etc.), etc.).

As illustrated in FIG. 2B, the plant strata identifier 123 can transmit strata data to the user interface generator 131 at (11) and the plant health identifier 124 can transmit plant health data to the user interface generator 131 at (12). The user interface generator 131 can then generate a shape file with the strata and plant health data (e.g., instead of the AI-based image processor 122, the plant strata identifier 123, and/or the plant health identifier 124) at (13). The user interface generator 131 can also generate user interface data at (14) that can be used to render a user interface that may or may not depict the shape file. For example, the resulting user interface may be a user interface depicted in FIGS. 7A, 7B, 8A, 8B, and/or 8C.

The user interface generator 131 can store the shape file in the shape file data store 127 at (15). For example, the shape file can be stored for later retrieval by a user device 102. The user interface generator 131 can also transmit the user interface data to the user device 102 at (16). Reception of the user interface data may cause the user device 102 to render and display a user interface based on the user interface data.

Example Block Diagram for Determining Soil Moisture

Figure 3:
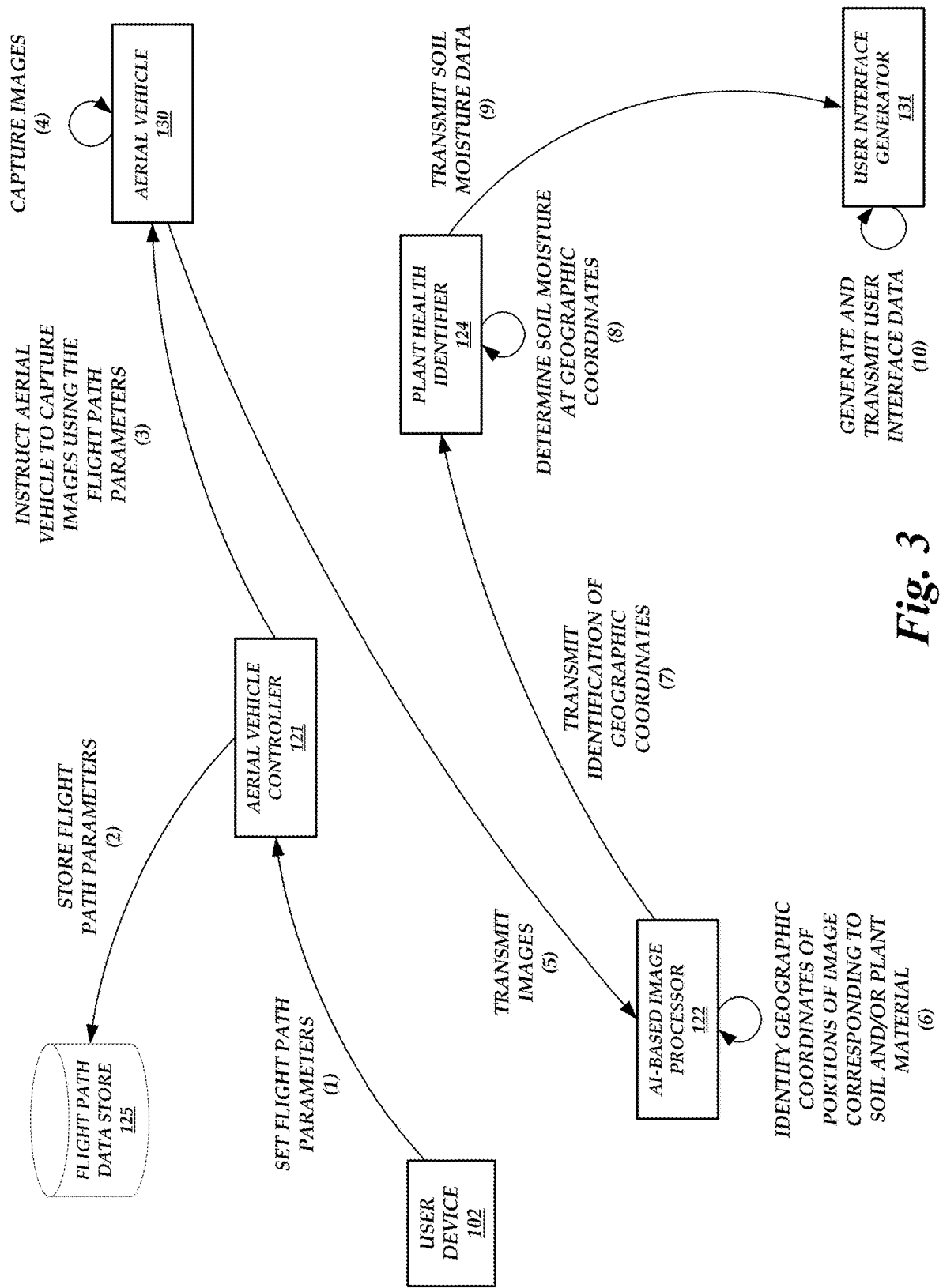
FIG. 3 is a flow diagram illustrating the operations performed by the components of the operating environment of FIG. 1 to determine soil moisture at a site, according to one embodiment.

FIG. 3 is a flow diagram illustrating the operations performed by the components of the operating environment 100 of FIG. 1 to determine soil moisture at a site, according to one embodiment. As illustrated in FIG. 3, the user device 102, based on input from a user, sets flight path parameters and transmits the flight path parameters to the aerial vehicle controller 121 at (1). The aerial vehicle controller 121 may then optionally store the flight path parameters in the flight path data store 125 at (2). Before, during, or after storing the flight path parameters, the aerial vehicle controller 121 can instruct the aerial vehicle 130 at (3) to capture images using the flight path parameters.

In response to receiving the instruction to capture images, the aerial vehicle 130 can begin a flight and capture images at (4). As images are captured and/or after the flight is complete, the aerial vehicle 130 can transmit the images to the AI-based image processor 122 at (5).

The captured images may include RGB images, chlorophyll images, and/or NDVI images. The AI-based image processor 122 can stitch like images together to form, for example, an RGB stitched image, a chlorophyll stitched image, and/or an NDVI stitched image. The AI-based image processor 122 can the process the RGB stitched image to identify geographic coordinates of portions of the image corresponding to plant material at (6). For example, the AI-based image processor 122 can provide the RGB stitched image as an input to a machine learning model trained to identify soil and/or plant material in images. The machine learning model can output pixels likely corresponding to soil and/or plant material, and the AI-based image processor 122 can identify geographic coordinates corresponding to the outputted pixels. The AI-based image processor 122 can transmit an indication of the identified geographic coordinates to the plant health identifier 124 at (7). The AI-based image processor 122 can also optionally generate a shape file for the site, including the indication of the identified geographic coordinates and/or the RGB stitched image in the shape file.

The plant health identifier 124 determines soil moisture levels at the geographic coordinates indicated by the AI-based image processor 122 at (8). For example, the plant health identifier 124 may obtain the NDVI stitched image from the AI-based image processor 122, and identify the color values of the pixels in the NDVI stitched image that are associated with the geographic coordinates identified by the AI-based image processor 122 as likely including soil and/or plant material. The plant health identifier 124 can then calculate the soil moisture levels (e.g., volumetric soil moisture) using Equation (3). The plant health identifier 124 can optionally modify the shape file for the site to include an indication of the soil moisture levels.

The plant health identifier 124 can transmit soil moisture data to the user interface generator 131 at (9). The user interface generator 131 can generate and transmit (e.g., to a user device 102) user interface data at (10) that can be used to render a user interface that depicts at least the soil moisture data.

Example Plant Health Detection Routine

Figure 4:
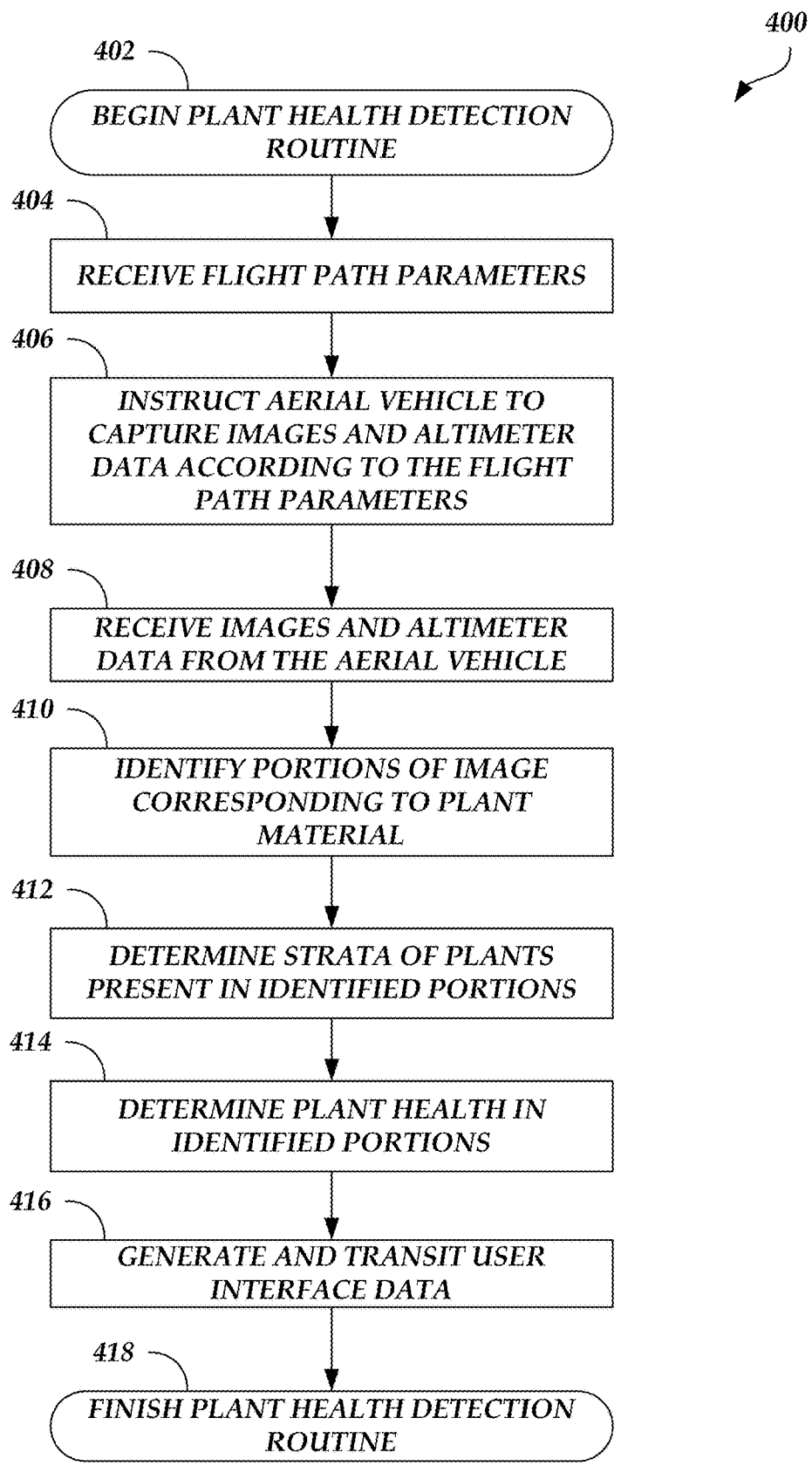
FIG. 4 is a flow diagram depicting a plant health detection routine illustratively implemented by a land analysis system, according to one embodiment.

FIG. 4 is a flow diagram depicting a plant health detection routine 400 illustratively implemented by a land analysis system, according to one embodiment. As an example, the land analysis system 120 of FIG. 1 can be configured to execute the plant health detection routine 400. The plant health detection routine 400 begins at block 402.

At block 404, flight path parameters are received. For example, the flight path parameters can include a flight path, a shooting angle, a capture mode, a gimbal pitch angle, an end-mission action, and/or the like. The flight path parameters can be received from a user device 102 or the flight path data store 125.

At block 406, an aerial vehicle is instructed to captures images and altimeter data according to the flight path parameters. For example, the aerial vehicle may capture images using a multispectral camera and may capture altimeter data using an altimeter 137.

At block 408, images and altimeter data are received from the aerial vehicle. For example, the images and altimeter data may be received in real-time and/or after the flight is complete.

At block 410, portions of the image (e.g., pixels and/or geographic coordinates) corresponding to plant material are identified. For example, RGB images can be stitched together, and a machine learning model can be used to identify portions of the RGB stitched image that likely depict plant material.

At block 412, a strata of plants in the identified portions is determined. For example, the altitude data can be used to identify the heights of plants in the portions of the RGB stitched image identified as likely depicting plant material.

At block 414, plant health in the identified portions is determined. For example, chlorophyll images can be stitched together, and plant health can be determined based on the color values of the pixels in the chlorophyll stitched image corresponding to the identified portions.

At block 416, user interface data is generated and transmitted. For example, the user interface data, when rendered by a user device 102, may cause the user device 102 to display a user interface in which the RGB stitched image, the locations of plants in the image, the strata of plants in the image, and/or the health of plants in the image are depicted. After the user interface data is generated and transmitted, the plant health detection routine 400 is complete, as shown at block 418.

Example Soil Moisture Detection Routine

Figure 5:
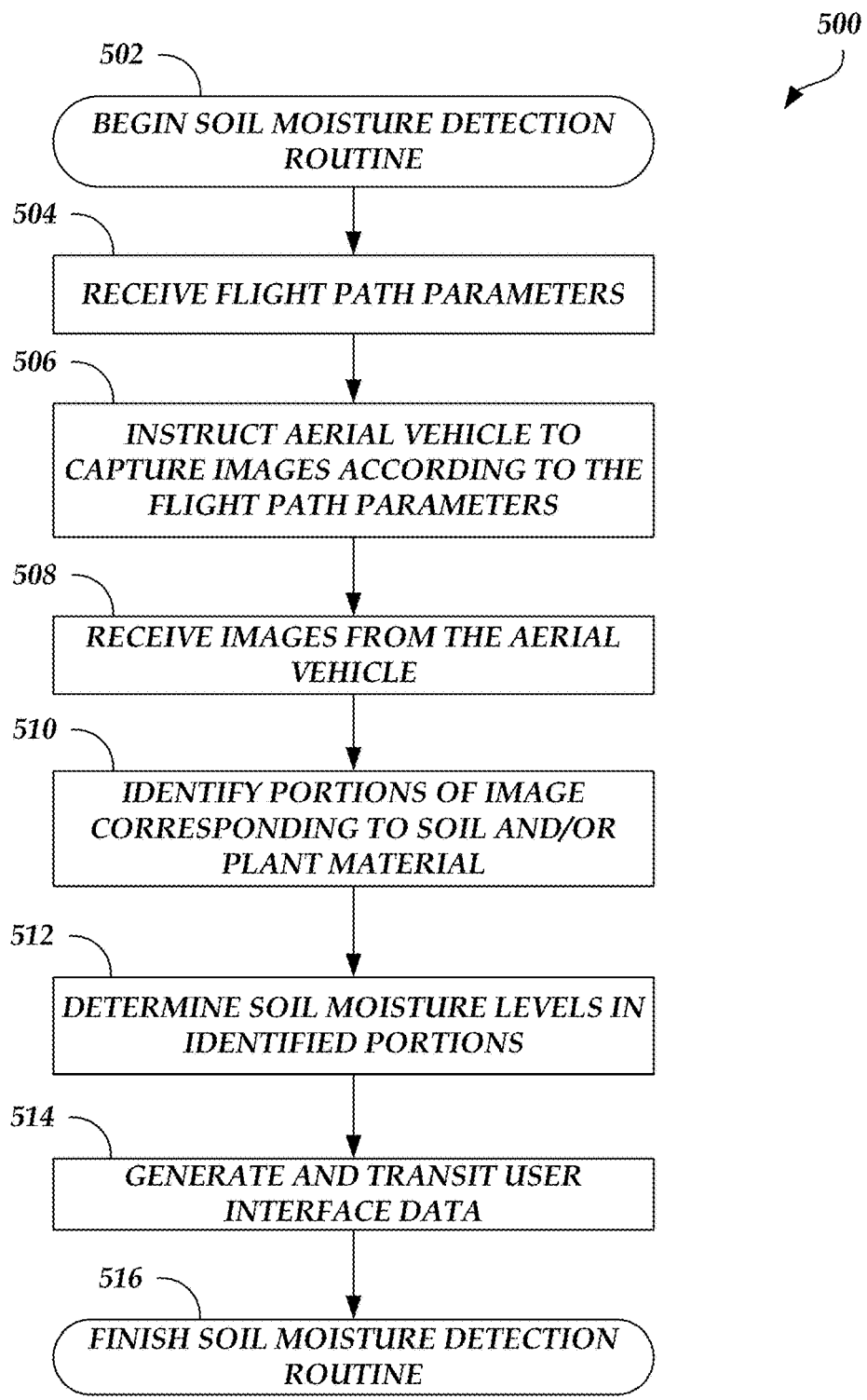
FIG. 5 is a flow diagram depicting a soil moisture detection routine illustratively implemented by a land analysis system, according to one embodiment.

FIG. 5 is a flow diagram depicting a soil moisture detection routine 500 illustratively implemented by a land analysis system, according to one embodiment. As an example, the land analysis system 120 of FIG. 1 can be configured to execute the soil moisture detection routine 500. The soil moisture detection routine 500 begins at block 502.

At block 504, flight path parameters are received. For example, the flight path parameters can include a flight path, a shooting angle, a capture mode, a gimbal pitch angle, an end-mission action, and/or the like. The flight path parameters can be received from a user device 102 or the flight path data store 125.

At block 506, an aerial vehicle is instructed to captures images according to the flight path parameters. For example, the aerial vehicle may capture images using a multispectral camera.

At block 508, images are received from the aerial vehicle. For example, the images and may be received in real-time and/or after the flight is complete.

At block 510, portions of the image (e.g., pixels and/or geographic coordinates) corresponding to soil and/or plant material are identified. For example, RGB images can be stitched together, and a machine learning model can be used to identify portions of the RGB stitched image that likely depict soil and/or plant material.

At block 512, soil moisture levels in the identified portions is determined. For example, NDVI images can be stitched together, and soil moisture levels can be determined based on the color values of the pixels in the NDVI stitched image corresponding to the identified portions as applied to Equation (3).

At block 514, user interface data is generated and transmitted. For example, the user interface data, when rendered by a user device 102, may cause the user device 102 to display a user interface in which the RGB stitched image, the locations of soil and/or plants in the image, and/or the soil moisture level of the soil and/or the soil underneath the plants in the image are depicted. After the user interface data is generated and transmitted, the soil moisture detection routine 500 is complete, as shown at block 516.

Example Aerial Vehicle Altitude Control Routine

Figure 6:
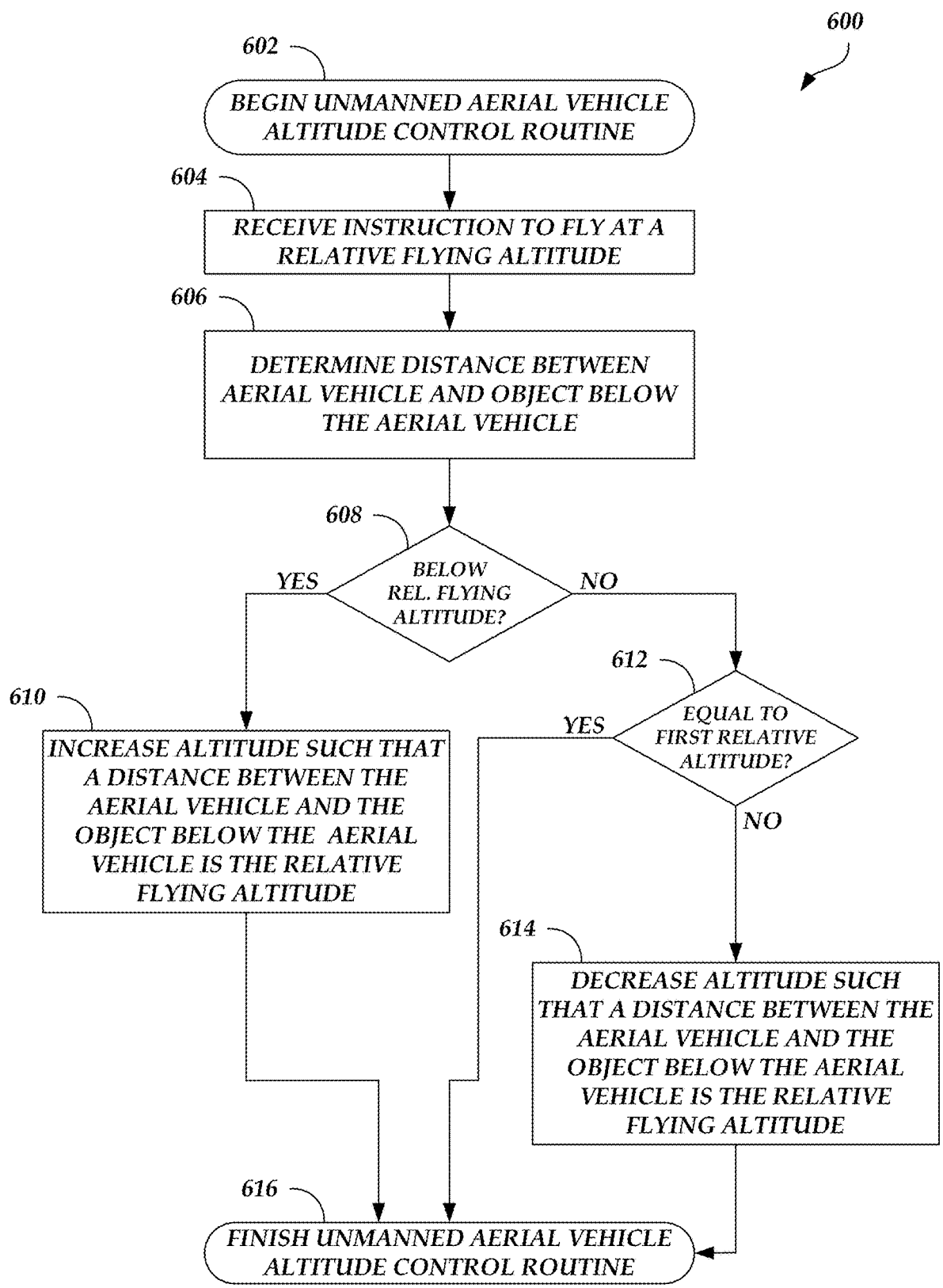
FIG. 6 is a flow diagram depicting an unmanned aerial vehicle altitude control routine illustratively implemented by an aerial vehicle, according to one embodiment.

FIG. 6 is a flow diagram depicting an unmanned aerial vehicle altitude control routine 600 illustratively implemented by an aerial vehicle, according to one embodiment. As an example, the aerial vehicle 130 of FIG. 1 can be configured to execute the unmanned aerial vehicle altitude control routine 600. The unmanned aerial vehicle altitude control routine 600 begins at block 602.

At block 604, instructions to fly at a relative flying altitude (e.g., a constant relative flying altitude) are received. For example, the instructions may be flight path parameters that include a flight path, a shooting angle, a capture mode, a gimbal pitch angle, an end-mission action, a constant relative flying altitude, and/or the like. A constant relative flying altitude may refer to an altitude that is a set distance above the ground (e.g., 25 m over the ground). An absolute flying altitude may vary given that the elevation of the land beneath the aerial vehicle 130 may rise and fall. The flight path parameters can be received from a user device 102 or the flight path data store 125.

At block 606, a distance between the aerial vehicle and an object below the aerial vehicle is determined. For example, the distance may be determined using the altimeter 137.

At block 608, a determination is made as to whether the distance between the aerial vehicle and the object below the aerial vehicle is below the relative flying altitude. If the distance is below the relative flying altitude, the aerial vehicle 130 may be flying too low to the ground. Thus, the unmanned aerial vehicle altitude control routine 600 proceeds to block 610. Otherwise, if the distance is not below the relative flying altitude, the aerial vehicle 130 is either flying at the relative flying altitude or flying too high. Thus, the unmanned aerial vehicle altitude control routine 600 proceeds to block 612.

At block 610, an altitude is increased such that a distance between the aerial vehicle and the object below the aerial vehicle is the relative flying altitude. After increasing the altitude, the unmanned aerial vehicle altitude control routine 600 ends, as shown at block 616.

At block 612, a determination is made as to whether the distance between the aerial vehicle and the object below the aerial vehicle is equal to the relative flying altitude. If the distance is equal to the relative flying altitude, the aerial vehicle 130 is flying at the correct altitude. Thus, the unmanned aerial vehicle altitude control routine 600 ends, as shown at block 616. Otherwise, if the distance is not equal to the relative flying altitude, the aerial vehicle 130 is flying too high. Thus, the unmanned aerial vehicle altitude control routine 600 proceeds to block 614.

At block 614, an altitude is decreased such that a distance between the aerial vehicle and the object below the aerial vehicle is the relative flying altitude. After decreasing the altitude, the unmanned aerial vehicle altitude control routine 600 ends, as shown at block 616.

The unmanned aerial vehicle altitude control routine 600 may be repeated numerous times as the aerial vehicle 130 flies along the flight path at the site. For example, the unmanned aerial vehicle altitude control routine 600 can be repeated every N meters, every M seconds, when the elevation of the land underneath the aerial vehicle 130 changes, etc. As described above, flying at the relative flying altitude may allow the land analysis system 120 to produce more accurate plant health and/or soil moisture level determinations.

Example User Interfaces

Figure 7A:
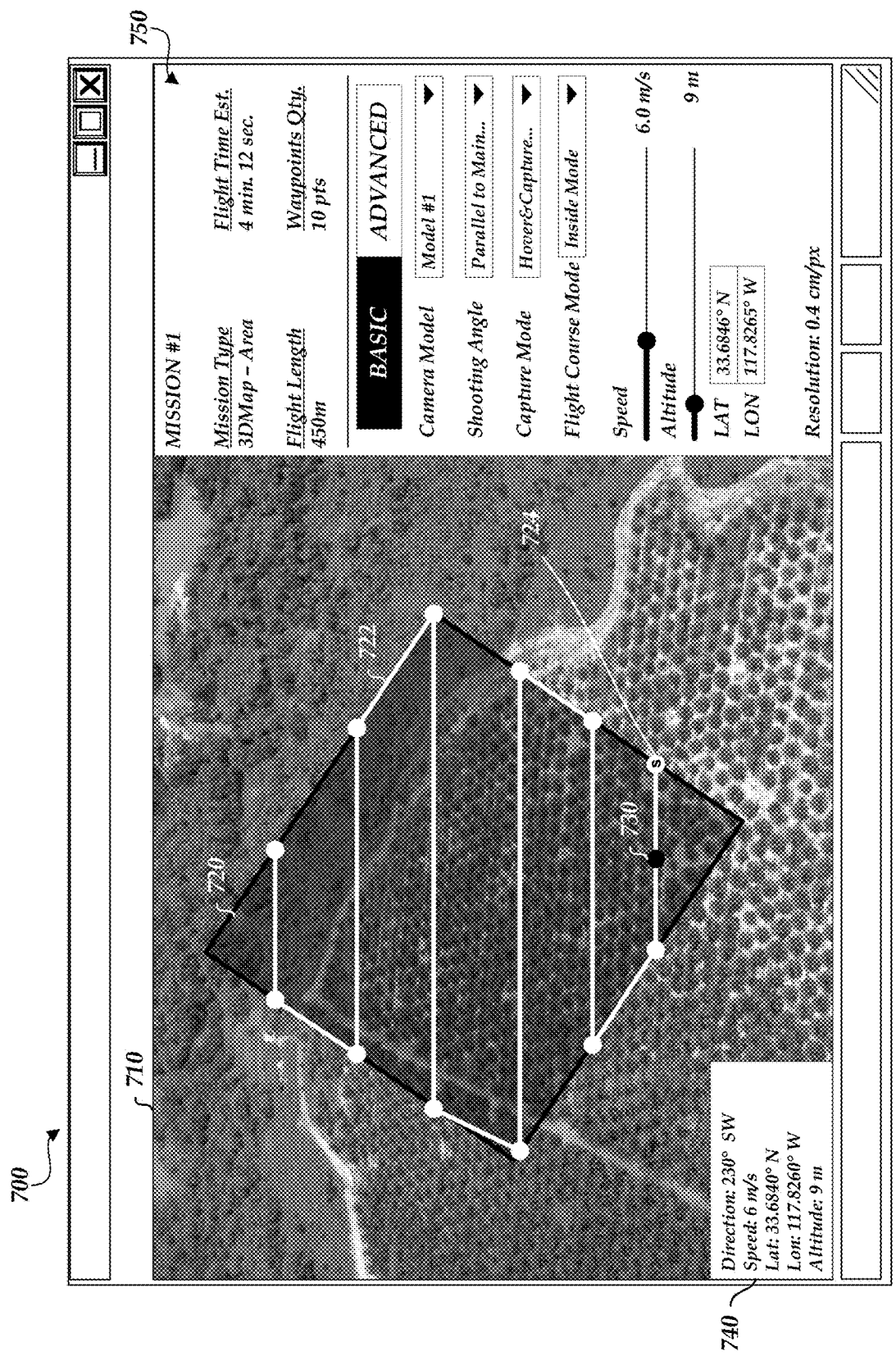
FIG. 7A illustrates a user interface displaying a site and a list of basic flight path parameters.

FIG. 7A illustrates a user interface 700 displaying a site 720 and a list 750 of basic flight path parameters. The user interface 700 may be displayed by a user device 102 based on a rendering of user interface data generated and provided by the land analysis system 120 (e.g., the user interface generator 131).

As illustrated in FIG. 7A, the user interface 700 displays a window 710 that includes an image depicting the site 720. The depiction of the site 720 is modified with a flight path 722 of the aerial vehicle 130 that overlays the image of the site 720. As described herein, a user can generate the flight path 722 by, for example, dragging a cursor or touch input across the user interface 700. Alternatively or in addition, the user can enter in the user interface 700 a set of geographic coordinates and an order in which the geographic coordinates are to be reached, thereby forming the flight path 722. Each time a direction of the flight path 722 changes, a waypoint (e.g., represented by white circles) may be depicted in the flight path 722 at the point of the direction change. In addition, a starting position 724 of the flight path 722 may be indicated in the window 710 as well as a current location 730 of the aerial vehicle 130 if the aerial vehicle 130 is already in flight.

The window 710 may further include a box 740 indicating current parameters of the aerial vehicle 130. For example, the box 740 may include the direction, speed, latitude, longitude, and/or altitude of the aerial vehicle 130.

The list 750 of basic flight path parameters may include a mission type (e.g., 3DMap, 2DMap, etc.), an estimated flight time, a flight length (e.g., a length of the flight path 722), a number of waypoints in the flight path 722, a camera model, a shooting angle, a capture mode, a flight course mode, an aerial vehicle 130 speed, an aerial vehicle 130 altitude (e.g., an absolute flying altitude and/or a relative flying altitude), geographic coordinates of a starting point (e.g., latitude and longitude), and/or a resolution of the camera.

There may be several types of shooting angles. For example, the parallel to main path shooting angle may cause a camera 132 to be positioned such that a lens of the camera 132 faces directly down (e.g., 90 degrees straight down) and is parallel with the ground and the vertical to main path shooting angle may cause a camera 132 to be positioned such that a lens of the camera 132 faces directly ahead or to the side of the aerial vehicle 130 and is perpendicular with the ground. In addition, the shooting angle may be selected to be an angle between parallel to main path and vertical to main path.

There may also be several types of capture modes. For example, the hover and capture at point capture mode results in a camera 132 capturing an image at each waypoint, the capture at equal time intervals capture mode results in a camera 132 capturing an image in set time intervals, and the capture at equal distance intervals results in a camera 132 capturing an image every threshold distance.

Figure 7B:
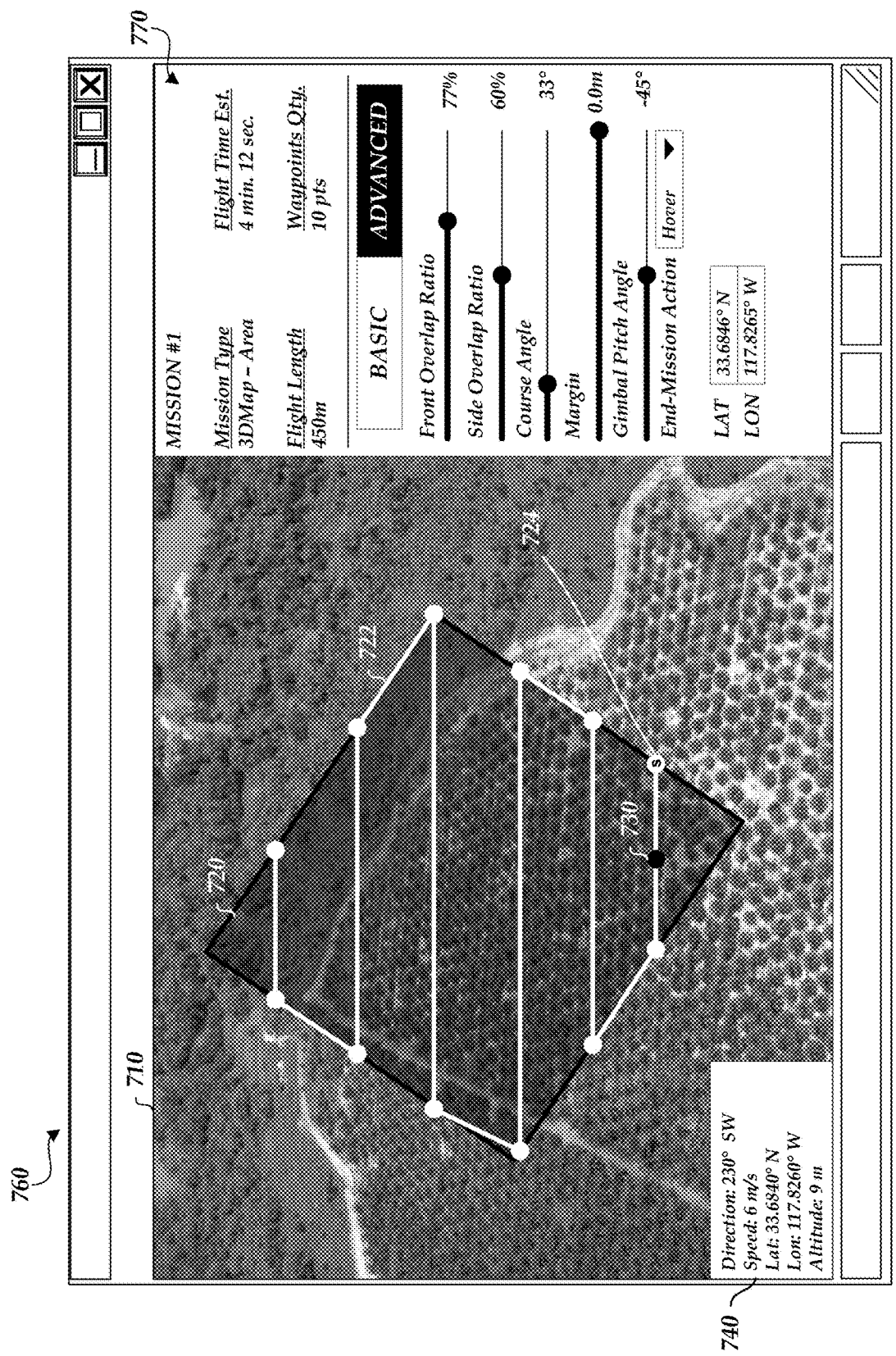
FIG. 7B illustrates a user interface displaying the site and a list of advanced flight path parameters.

FIG. 7B illustrates a user interface 760 displaying the site 720 and a list 770 of advanced flight path parameters. The user interface 760 may be displayed by a user device 102 based on a rendering of user interface data generated and provided by the land analysis system 120 (e.g., the user interface generator 131).

As illustrated in FIG. 7B, the list 770 of advanced flight path parameters can include some basic flight parameters (e.g., mission type, an estimated flight time, a flight length, a number of waypoints in the flight path 722, and geographic coordinates of a starting point), front overlap ratio, side overlap ratio, course angle, margin, gimbal pitch angle, and end-mission action.

If the user updates any of the basic or advanced flight path parameters in the user interfaces 700 or 760, this may cause the user device 102 to notify the aerial flight controller 121 of the update. The aerial flight controller 121 may then transmit an instruction to the flight path controller 138 to update the flight path according to the updated flight path parameter(s). Thus, the user may be able to update the flight path of the aerial vehicle 130 in real-time as the aerial vehicle 130 is in flight.

In further embodiments, not shown, the user interfaces 700 and/or 760 can display images and/or altitude data (e.g., altitude of the aerial vehicle 130, distance between a bottom portion of the aerial vehicle 130 and a top portion of an object below the aerial vehicle 130, etc.) captured by the aerial vehicle 130 as those images and/or altitude data are captured. The images and/or altitude data may be received by the user device 102 from the AI-based image processor 122 and/or the plant strata identifier 123.

Figure 8A:
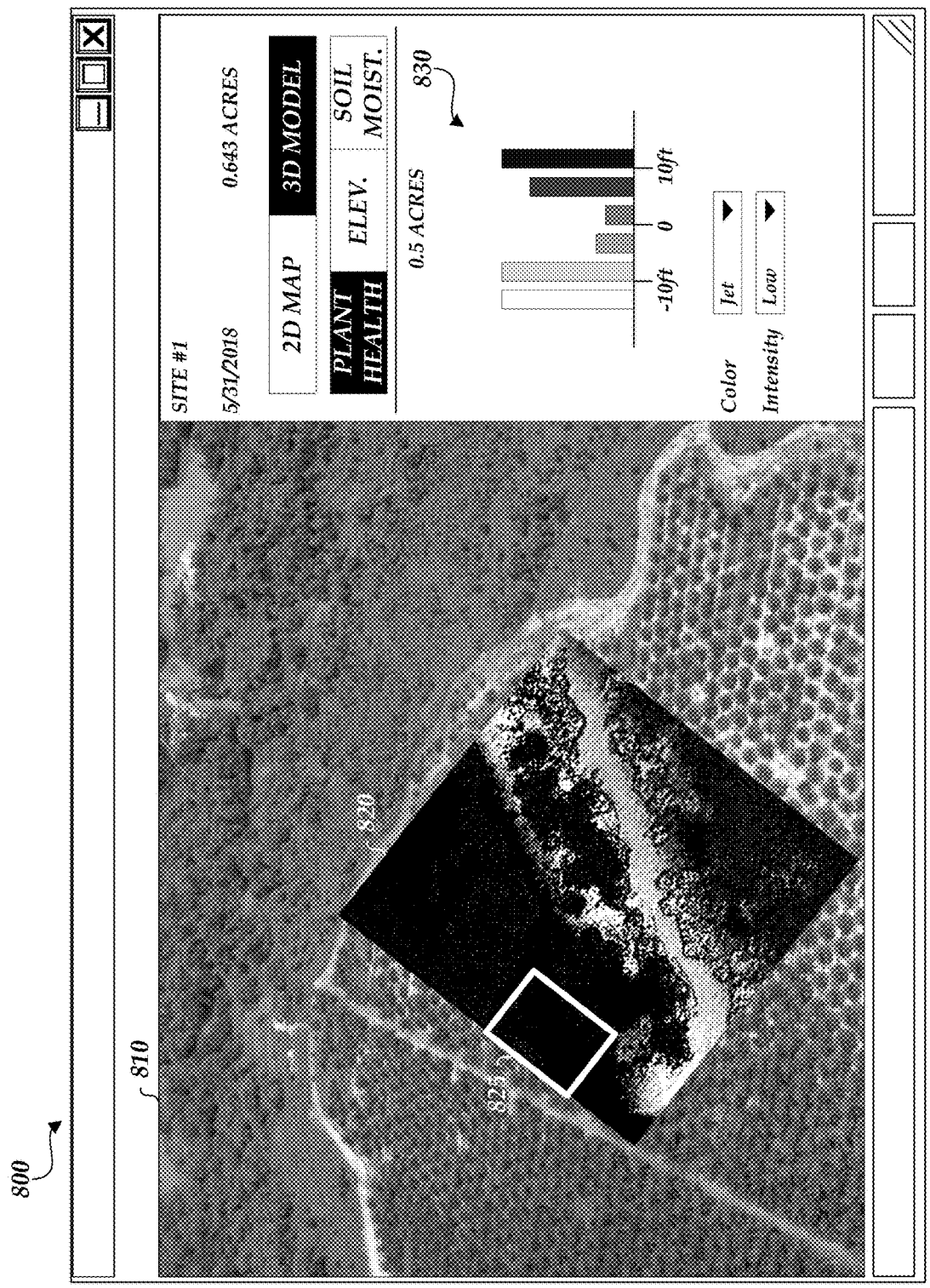
FIG. 8A illustrates a user interface displaying plant health data of a site overlaid over a high-resolution image (e.g., RGB stitched image) of the site depicted in a window.

FIG. 8A illustrates a user interface 800 displaying plant health data 820 of a site overlaid over a high-resolution image (e.g., RGB stitched image) of the site depicted in a window 810. The user interface 800 may be displayed by a user device 102 based on a rendering of user interface data generated and provided by the land analysis system 120 (e.g., the user interface generator 131). The user interface data may include a shape file generated by the land analysis system 120 such that information included in the shape file can be depicted in the user interface 800.

As described herein, the plant health identifier 124 can modify a shape file and transmit a report, scorecard, and/or shape file to the user device 102 to show plant health. In further embodiments, the user interface data and/or the shape file included in the user interface data can be appended with additional information for display in a user interface, such as the user interface 800. For example, as illustrated in FIG. 8A, the modified orthomosaic image can be appended with information identifying a size of the site (e.g., 0.643 acres), a date, a histogram 830, and options to modify the format in which the plant health data overlaid over the RGB stitched image is displayed (e.g., color options can be changed to jet, black and white, grayscale, etc.; intensity options can be changed to low, medium, high, etc.). The histogram 830 may show a quantity or percentage of plants in the site that have a particular health. The histogram 830 may further show a quantity or percentage of plants in different strata in the site that have a particular health. Each health level may correspond to a shaded color (e.g., an RGB value, a grayscale value, etc.). The health levels can be absolute values or normalized (e.g., on a scale from −1 to 1, where −1 is the unhealthiest level and 1 is the healthiest level).

The RGB stitched image may be modified with box 825. Box 825 may be added to the RGB stitched image by the plant health identifier 124 to indicate that if the plants in the portion of the site within box 825 become healthier (e.g., to a certain plant health level), then a desired coverage percentage will be reached.

Figure 8B:
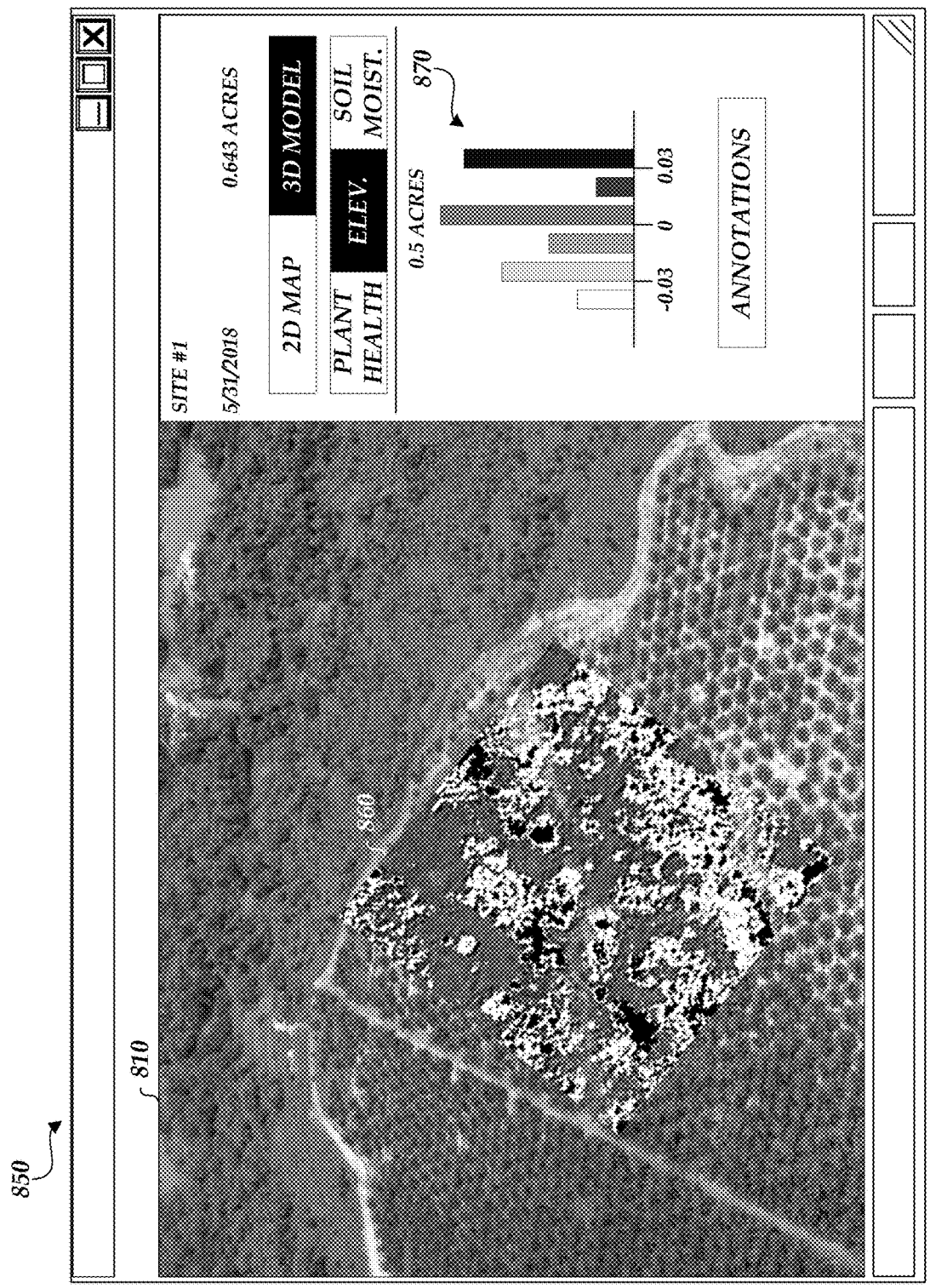
FIG. 8B illustrates a user interface displaying elevation of a site overlaid over a high-resolution image (e.g., RGB stitched image) of the site depicted in the window.

FIG. 8B illustrates a user interface 850 displaying elevation 860 of a site overlaid over a high-resolution image (e.g., RGB stitched image) of the site depicted in the window 810. The user interface 850 may be displayed by a user device 102 based on a rendering of user interface data generated and provided by the land analysis system 120 (e.g., the user interface generator 131). The user interface data may include a shape file generated by the land analysis system 120 such that information included in the shape file can be depicted in the user interface 850.

As illustrated in FIG. 8B, the user interface data and/or a shape file included in the user interface data is appended with a size of the site (e.g., 0.643 acres), a date, a histogram 870, and options to annotate the RGB stitched image. The histogram 870 may show a quantity or percentage of terrain in the site that has a particular elevation. Each elevation level may correspond to a shaded color (e.g., an RGB value, a grayscale value, etc.).

Figure 8C:
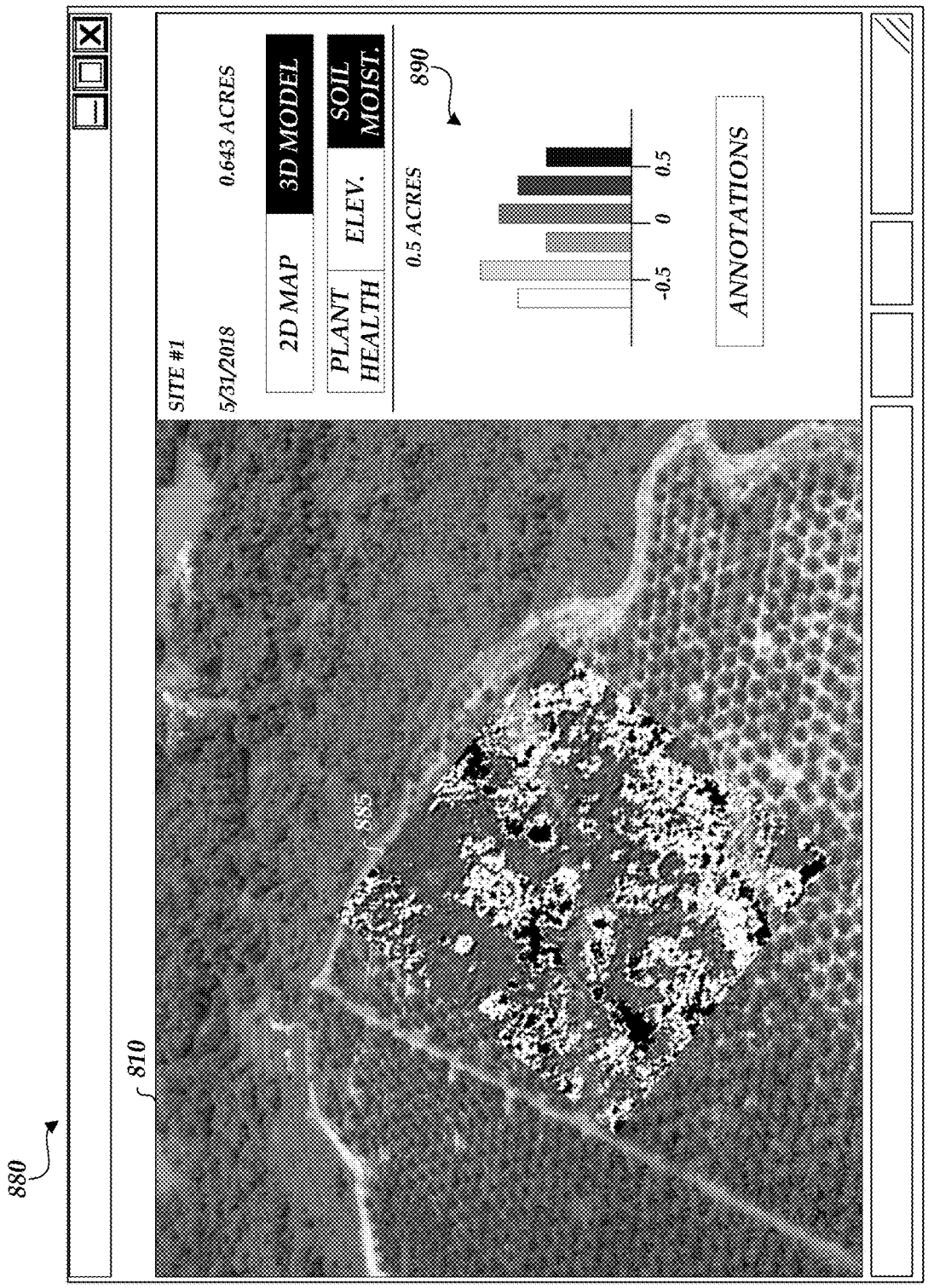
FIG. 8C illustrates a user interface displaying soil moisture levels of a site overlaid over a high-resolution image (e.g., RGB stitched image) of the site depicted in the window.

FIG. 8C illustrates a user interface 880 displaying soil moisture levels 885 of a site overlaid over a high-resolution image (e.g., RGB stitched image) of the site depicted in the window 810. The user interface 880 may be displayed by a user device 102 based on a rendering of user interface data generated and provided by the land analysis system 120 (e.g., the user interface generator 131). The user interface data may include a shape file generated by the land analysis system 120 such that information included in the shape file can be depicted in the user interface 880.

As illustrated in FIG. 8C, the user interface data and/or a shape file included in the user interface data is appended with a size of the site (e.g., 0.643 acres), a date, a histogram 890, and options to annotate the RGB stitched image. The histogram 890 may show a quantity or percentage of terrain in the site that has a particular soil moisture level. Each soil moisture level may correspond to a shaded color (e.g., an RGB value, a grayscale value, etc.).

Example Aerial Vehicle

Figure 9:
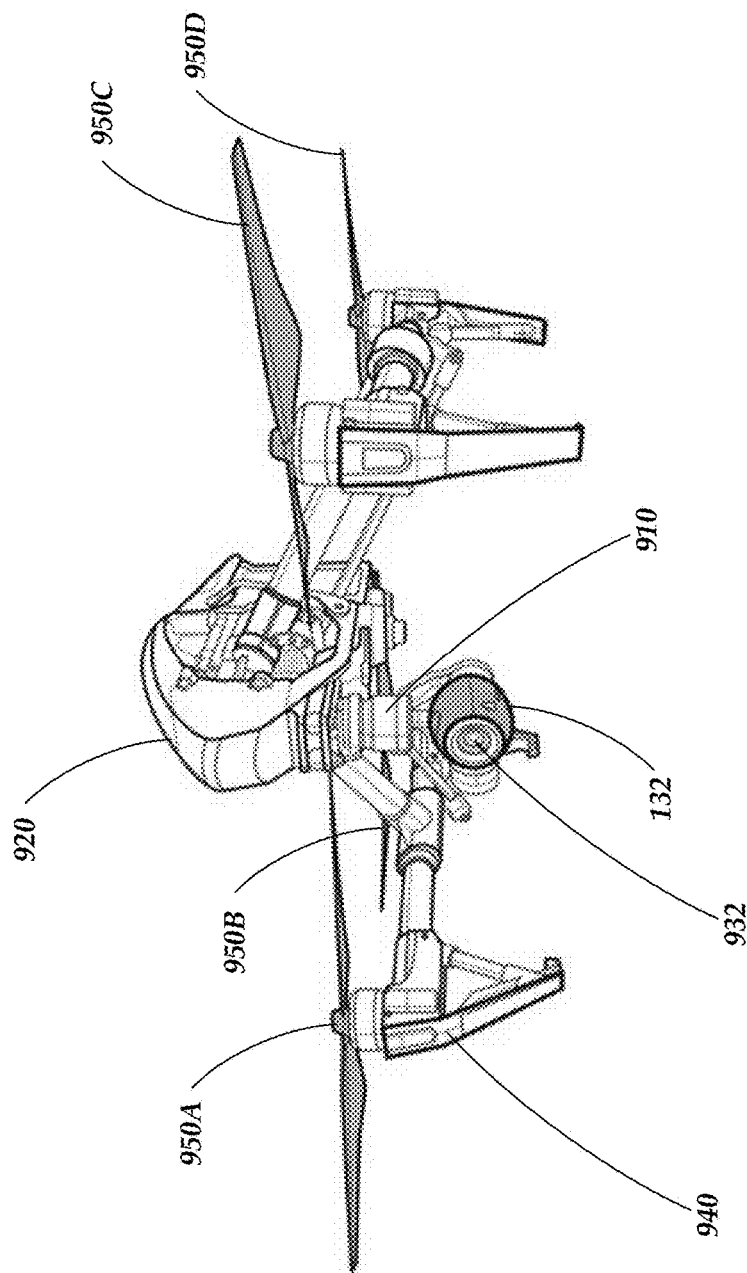
FIG. 9 illustrates an exemplary aerial vehicle of FIG. 1.

FIG. 9 illustrates an exemplary aerial vehicle 130. As illustrated in FIG. 9, the aerial vehicle 130 is an unmanned aerial vehicle in which a camera 132 is coupled to a body 920 of the aerial vehicle 130 via a gimbal 910. The aerial vehicle 130 further includes four rotors 950A-D. For example, the exemplary aerial vehicle 130 illustrated in FIG. 9 may be the INSPIRE 1 PRO drone. While the exemplary aerial vehicle 130 illustrated in FIG. 9 includes four rotors 950A-D, this is not mean to be limiting. For example, the aerial vehicle 130 may include any number of rotors (e.g., six, eight, ten, twelve, etc.).

The gimbal 910 may allow the camera 132 to rotate 360 degrees within a horizontal plane (e.g., a plane that extends from a left side of the aerial vehicle 130 to a right side of the aerial vehicle 130, a plane that extends from a back side of the aerial vehicle 130 to a front side of the aerial vehicle 130, etc.). As an illustrative example, the gimbal 910 may allow the camera 132 to be positioned such that a lens 932 of the camera 132 faces a right-front rotor apparatus 940.

Similarly, the gimbal 910 may allow the camera 132 to rotate at least 180 degrees within a vertical plane (e.g., a plane that extends from a top side of the aerial vehicle 130 to a bottom side of the aerial vehicle 130). As an illustrative example, the gimbal 910 may allow the camera 132 to be positioned such that the lens 932 faces a surface directly below the body 920 of the aerial vehicle 130.

Example Block Diagram for Locating Algae or Other Floating Vegetation

Figure 10:
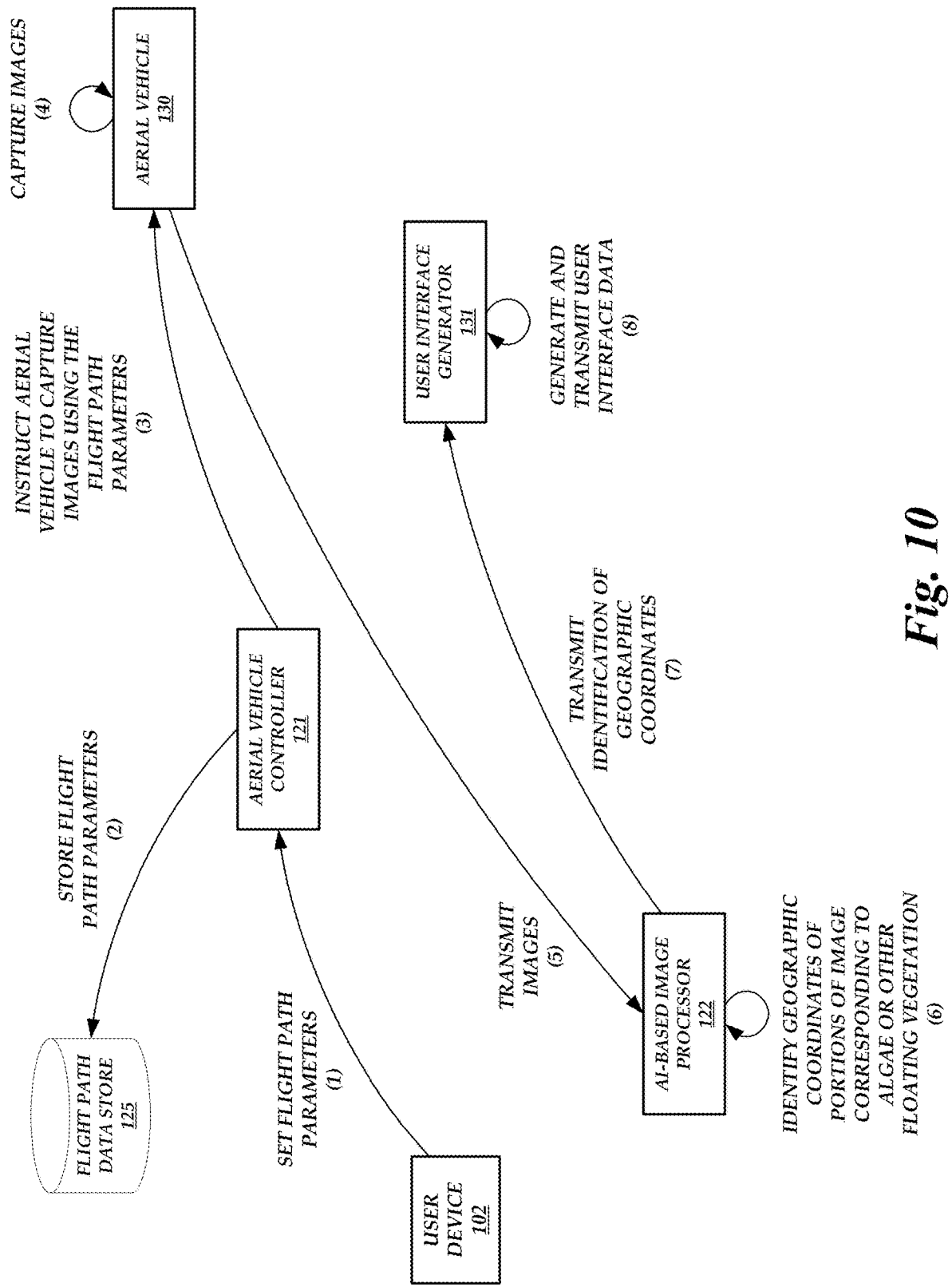
FIG. 10 is a flow diagram illustrating the operations performed by the components of the operating environment of FIG. 1 to determine the location of algae or other floating vegetation in a body of water, according to one embodiment.

FIG. 10 is a flow diagram illustrating the operations performed by the components of the operating environment 100 of FIG. 1 to determine the location of algae or other floating vegetation in a body of water, according to one embodiment. As illustrated in FIG. 10, the user device 102, based on input from a user, sets flight path parameters and transmits the flight path parameters to the aerial vehicle controller 121 at (1). The aerial vehicle controller 121 may then optionally store the flight path parameters in the flight path data store 125 at (2). Before, during, or after storing the flight path parameters, the aerial vehicle controller 121 can instruct the aerial vehicle 130 at (3) to capture images using the flight path parameters. The flight path parameters may instruct the aerial vehicle 130 to fly over at least a portion of a body of water to capture the images.

In response to receiving the instruction to capture images, the aerial vehicle 130 can begin a flight and capture images at (4). The images captured may be RGB images, NIR images, and/or SWIR images. As images are captured and/or after the flight is complete, the aerial vehicle 130 can transmit the images to the AI-based image processor 122 at (5).

The AI-based image processor 122 can stitch like images together to form, for example, an RGB stitched image, an NIR stitched image, and/or a SWIR stitched image. The AI-based image processor 122 can the process one or more of the stitched images to identify geographic coordinates of portions of the image corresponding to algae or other floating vegetation at (6). For example, the AI-based image processor 122 can use the RGB stitched image and the NIR stitched image to calculate the blue channel version of the NDVI for various pixels in the stitched images (e.g., various geographic coordinates covered by the stitched images). The AI-based image processor 122 can then calculate a median value of the blue channel NDVI values, setting the median value as a threshold value. Finally, the AI-based image processor 122 can assign pixels (or geographic coordinates corresponding to the pixels) as being "algae" or "floating vegetation" if the respective pixel has a blue channel NDVI value that is above (or below) the threshold value. As another example, the AI-based image processor 122 can use the RGB stitched image, the NIR stitched image, and the SWIR stitched image to calculate the FAI for various pixels in the stitched images (e.g., various geographic coordinates covered by the stitched images). The AI-based image processor 122 can then assign pixels (or geographic coordinates corresponding to the pixels) as being "algae" or "floating vegetation" if the respective pixel has an FAI value above (or below) 0 (or 1, 2, 3, etc.) and a Rayleigh-corrected red channel value below (or above) a threshold value (e.g., 0.06, 0.08, 0.10, etc.). The AI-based image processor 122 can transmit an indication of the identified geographic coordinates to the user interface generator 131 at (7). The AI-based image processor 122 can also optionally generate a shape file for the site, including the indication of the identified geographic coordinates, the RGB stitched image, the NIR stitched image, and/or the SWIR stitched image in the shape file.

The user interface generator 131 can generate and transmit (e.g., to a user device 102) user interface data at (8) that can be used to render a user interface that depicts at least a location of the detected algae or other floating vegetation. For example, the user interface can depict the location of the detected algae or other floating vegetation superimposed over an image of a body of water.

Example Algae Detection Routine

Figure 11:
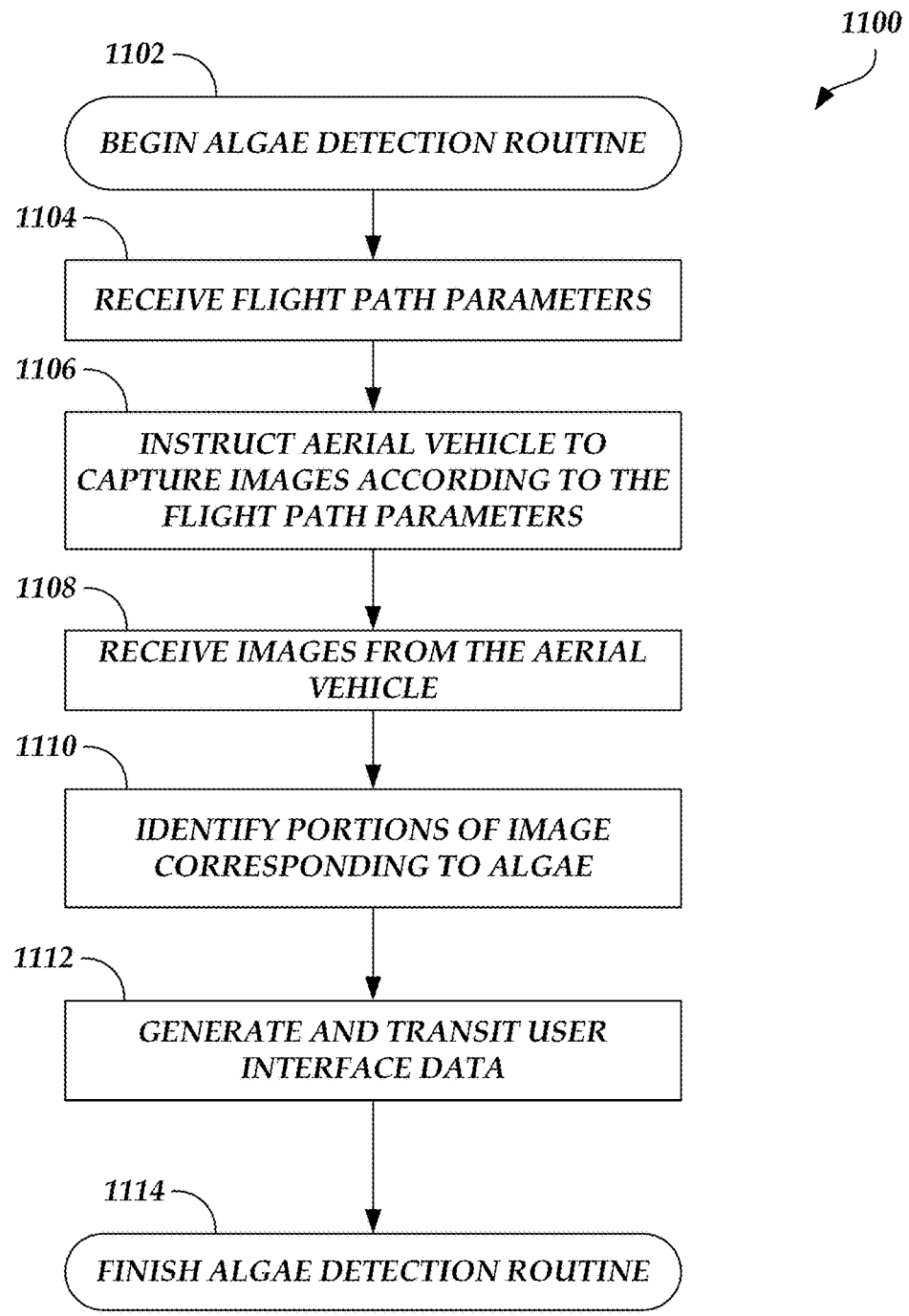
FIG. 11 is a flow diagram depicting an algae detection routine illustratively implemented by a land analysis system, according to one embodiment.

FIG. 11 is a flow diagram depicting an algae detection routine 1100 illustratively implemented by a land analysis system, according to one embodiment. As an example, the land analysis system 120 of FIG. 1 can be configured to execute the algae detection routine 1100. The algae detection routine 1100 begins at block 1102.

At block 1104, flight path parameters are received. For example, the flight path parameters can include a flight path, a shooting angle, a capture mode, a gimbal pitch angle, an end-mission action, and/or the like. The flight path parameters can be received from a user device 102 or the flight path data store 125 and direct an aerial vehicle 130 to fly over at least a portion of a body of water.

At block 1106, an aerial vehicle is instructed to captures images according to the flight path parameters. For example, the aerial vehicle may capture images using a multispectral camera. The aerial vehicle may capture images such as RGB images, NIR images, and/or SWIR images.

At block 1108, images are received from the aerial vehicle. For example, the images and may be received in real-time and/or after the flight is complete.

At block 1110, portions of the image (e.g., pixels and/or geographic coordinates) corresponding to algae (or other floating vegetation) are identified. For example, RGB images can be stitched together, NIR images can be stitched together, and/or SWIR images can be stitched together, with one or more of the stitched images being used to detect the location of algae (or other floating vegetation). Alternatively, the location of algae (or other floating vegetation) can be determined (e.g., by the AI-based image processor 122) without stitching together the RGB images, the NIR images, and/or the SWIR images. Rather, the RGB images, the NIR images, and/or the SWIR images can be evaluated individually or in groups to detect the location of algae (or other floating vegetation).

At block 1112, user interface data is generated and transmitted. For example, the user interface data, when rendered by a user device 102, may cause the user device 102 to display a user interface in which the RGB stitched image and/or the locations of algae or other floating vegetation are depicted. After the user interface data is generated and transmitted, the algae detection routine 1100 is complete, as shown at block 1114.

Example Plant Detection Routine

Figure 12:
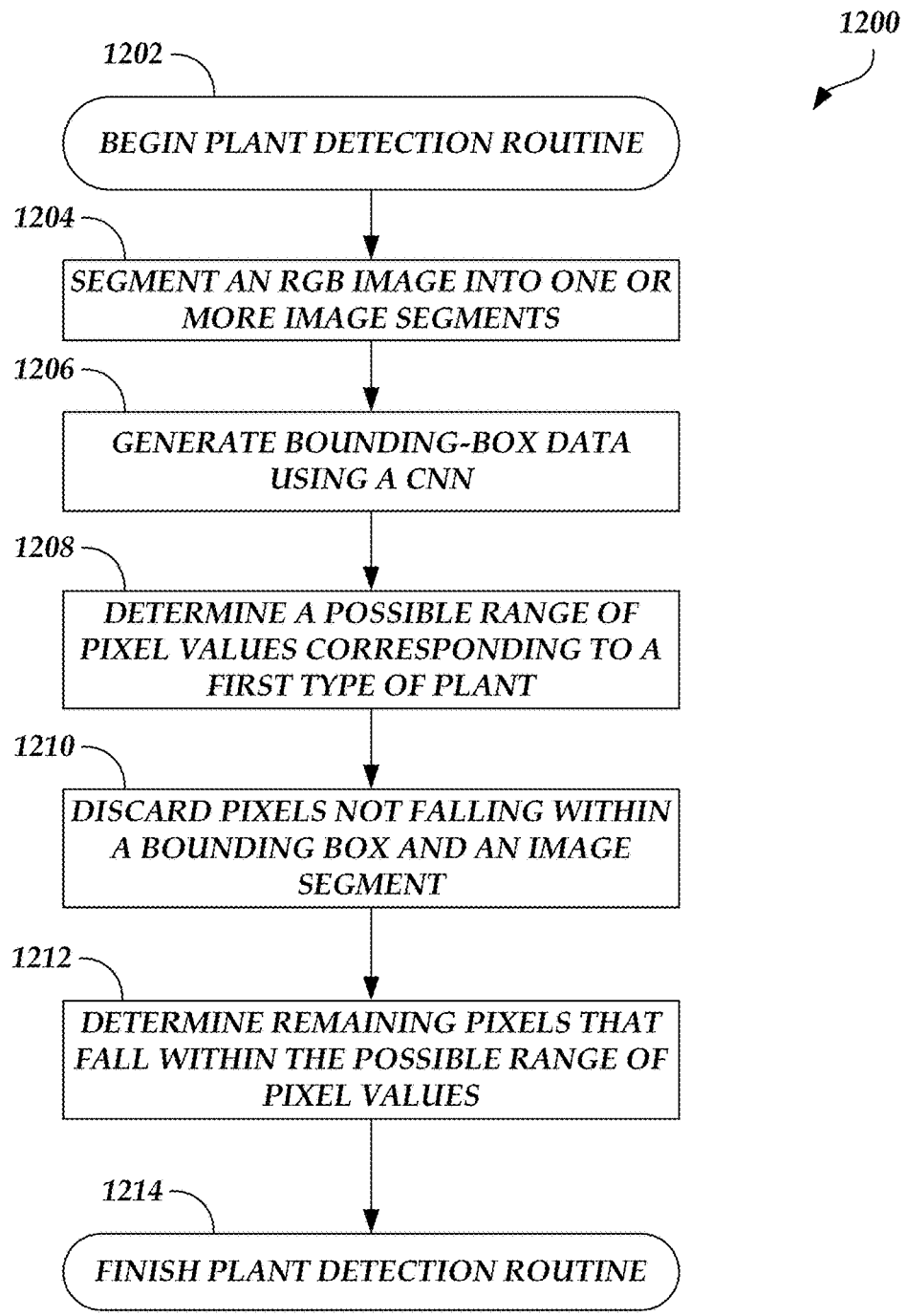
FIG. 12 is a flow diagram depicting a plant detection routine illustratively implemented by a land analysis system, according to one embodiment

FIG. 12 is a flow diagram depicting a plant detection routine 1200 illustratively implemented by a land analysis system, according to one embodiment. As an example, the land analysis system 120 of FIG. 1 (e.g., the AI-based image processor 122) can be configured to execute the plant detection routine 1200. The plant detection routine 1200 begins at block 1202.

At block 1204, an RGB image is segmented into one or more image segments. For example, the RGB image can be an RGB stitched image. Each image segment may depict at least one object. In some embodiments, the image segments may not result in the complete RGB stitched image if merged together given that some portions of the RGB stitched image may not depict any objects. In further embodiments, a modified version of an ENet semantic segmentation deep neural network can be used to perform the image segmentation.

At block 1206, bounding-box data is generated using a CNN. For example, the CNN can be a modified version of a Faster R-CNN that is modified to include additional ROI pooling layers and/or additional fully connected layers. In some embodiments, the CNN takes the RGB stitched image as an input and outputs coordinates of one or more bounding boxes outlined in the RGB stitched image and/or classifications of object(s) outlined by the bounding box(es) to form the bounding-box data.

At block 1208, a possible range of pixel values corresponding to a first type of plant is determined. For example, a CNN can be associated with a particular type of plant (e.g., trained to identify a particular type of plant). Thus, if a user is attempting to identify a first type of plant in an image, the AI-based image processor 122 can obtain the CNN trained to identify the first type of plant and apply the image as an input to this CNN. If a user is attempting to identify multiple types of plants in an image (or has not otherwise specified the type of plant to locate), the AI-based image processor 122 can obtain one or more CNNs trained to identify the multiple types of plants (or trained to identify various, randomly selected types of plants) and apply the image as an input to the CNN(s). The AI-based image processor 122 can take the pixels falling within a bounding box outlined by a CNN trained to identify the first type of plant and determine a possible range of pixels corresponding to a first type of plant using these pixels.

At block 1210, pixels not falling within a bounding box and an image segment are discarded. For example, if a pixel forms part of an image segment, but does not fall within a bounding box outlined by the CNN, the pixel (and possibly the image segment itself) is discarded. Similarly, if a pixel falls within a bounding box outlined by the CNN, but does not form part of an image segment, the pixel is discarded. In some embodiments, an entire image segment is discarded if at least one of the pixels that forms the image segment is discarded. In other embodiments, an entire image segment is discarded if all of the pixels that form the image segment are discarded.

At block 1212, the pixels that remain that fall within the possible range of pixel values is determined. For example, certain pixels corresponding to one or more image segments may remain after the discarding operation. In some embodiments, the AI-based image processor 122 compares the remaining pixels to the possible range of pixel values to determine which pixels, if any, fall within the possible range. For those pixels that fall within the possible range, the AI-based image processor 122 can draw an outline around those pixels to indicate that the first type of plant is likely depicted therein, can annotate or highlight those pixels to indicate that the first type of plant is likely depicted therein, and/or otherwise annotate the RGB stitched image to indicate that those pixels likely form the first type of plant. After the pixels that remain that fall within the possible range of pixel values is determined, the plant detection routine 1200 is complete, as shown at block 1214.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to view captured images, set flight path parameters, modify a flight path during flight, and/or view predictions and associated annotated orthomosaic images.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The techniques described herein with respect to the land analysis system 120 may be applicable to habitat restoration, agriculture (e.g., farming), cattle management, commercial landscaping, forestry, timber management, fire control management, urban forestry, and/or other industries in which monitoring plant health may be important. For example, the land analysis system 120 can use detected plant health and/or soil moisture levels to control the irrigation system 150, control a lighting system, control the dispensing of fertilizer (e.g., in a manner similar to how the irrigation system 150 is controlled as described above, when soil moisture levels are below a threshold value, etc.), control insect repellant spraying (e.g., in a manner similar to how the irrigation system 150 is controlled, as described above), detect pests (e.g., unhealthy vegetation and/or abnormal soil moisture levels may indicate the present of pests), detect when to harvest plants (e.g., plants may be harvested when at a certain size and/or health level and/or when soil moisture is at certain levels, where the size can be determined by the land analysis system 120 by analyzing pixels in captured images and using object recognition techniques) and/or transmit a corresponding notification to a user device 102 and/or transmit an instruction to an automated vehicle (e.g. a combine) to commence harvesting, detect when cattle food sources are low (e.g., if vegetation on which cattle graze are unhealthy and/or soil moisture levels are below a threshold value), detect possible fire conditions (e.g., if a number of trees in a forest appear to be unhealthy, if soil moisture levels are low, etc.), and/or the like.

As used herein, the terms "real-time" and "near real-time," in addition to having their ordinary meaning, are often used herein to describe operations or actions performed sufficiently fast so as to avoid introducing perceptible delay into capture, transmission, and display of images, and may but need not mean "immediately" or "instantaneously."

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for determining plant health, the system comprising:
   an unmanned aerial vehicle, wherein the unmanned aerial vehicle comprises one or more cameras and an altimeter; and
   a computing system comprising one or more computing devices, wherein the computing system is configured to communicate with the unmanned aerial vehicle and configured with specific computer-executable instructions to:
      instruct the unmanned aerial vehicle to capture a first set of images and a second set of images using the one or more cameras and to capture altitude data using the altimeter while flying along a flight path;
      process the first set of images to form a first stitched image, wherein processing the first set of images comprises stitching together a plurality of images of the first set;
      process the second set of images to form a second stitched image, wherein processing the second set of images comprises stitching together a plurality of images of the second set;
      identify a portion of the first stitched image corresponding to plant material based on an application of the first stitched image as an input to a trained machine learning model;
      determine that a first set of geographic coordinates correspond to the portion of the first stitched image;
      determine heights of the plant material using the altitude data corresponding to the first set of geographic coordinates; and
      determine health of the plant material based on values of pixels in the second stitched image corresponding to the first set of geographic coordinates.

2. The system of claim 1, wherein the altitude data comprises an altitude of the unmanned aerial vehicle at a first geographic coordinate in the first set of geographic coordinates and a distance between the unmanned aerial vehicle and an object below the unmanned aerial vehicle at the first geographic coordinate.

3. The system of claim 2, wherein the computing system is further configured with specific computer-executable instructions to:
   obtain an indication of an elevation of land at the first geographic coordinate; and
   subtract the elevation and the distance from the altitude of the unmanned aerial vehicle to determine a height of a portion of the plant material at the first geographic coordinate.

4. The system of claim 1, wherein the computing system is further configured with specific computer-executable instructions to train the machine learning model using training data that comprises a third set of images annotated to indicate portions of the third set of images in which second plant material is present and a fourth set of images annotated to indicate portions of the fourth set of images in which third plant material is not present.

5. The system of claim 1, wherein the computing system is further configured with specific computer-executable instructions to generate a shape file that comprises at least one of the first stitched image, an indication that the first set of geographic coordinates correspond to the plant material, an indication of the heights of the plant material, or an indication of the health of the plant material.

6. The system of claim 5, wherein the computing system is further configured with specific computer-executable instructions to:
   generate user interface data that comprises the shape file; and
   transmit the user interface data to a user device, wherein the user interface data, when rendered by the user device, causes the user device to display a user interface in which data included in the shape file is depicted.

7. The system of claim 1, wherein the computing system is further configured with specific computer-executable instructions to:
   instruct the unmanned aerial vehicle to capture a third set of images while flying along the flight path;
   process the third set of images to form a third stitched image; and
   determine soil moisture levels based on values of pixels in the third stitched image corresponding to the first set of geographic coordinates.

8. The system of claim 1, wherein the computing system is further configured with specific computer-executable instructions to instruct the unmanned aerial vehicle to fly at a constant relative flying altitude while flying along the flight path.

9. The system of claim 1, wherein the one or more cameras comprises a multispectral camera that captures RGB images and chlorophyll images.

10. The system of claim 9, wherein the first set of images comprises a first set of RGB images.

11. The system of claim 9, wherein the second set of images comprises a second set of chlorophyll images.

12. The system of claim 1, wherein each pixel in the first set of images is geo-tagged with a specific geographic coordinate.

13. The system of claim 1, wherein the computing system is further configured with specific computer-executable instructions to:
receive flight path parameters from a user device over a network; and
instruct the unmanned aerial vehicle to capture the first set of images and the second set of images using the one or more cameras and to capture altitude data using the altimeter while flying along a flight path in a manner defined by the flight path parameters.

14. The system of claim 13, wherein the flight path parameters comprise at least one of geographic coordinates, waypoints, flight length, flight time, speed, altitude, camera shooting angle, camera capture mode, or camera resolution.

15. A computer-implemented method of detecting plant health, the method comprising:
as implemented by one or more computing devices configured with specific computer-executable instructions,
instructing an aerial vehicle to commence a flight along a flight path such that the aerial vehicle captures a first set of images and a second set of images using at least one camera and altitude data using an altimeter;
generating a first stitched image using the first set of images and a second stitched image using the second set of images, wherein generating the first stitched image comprises stitching together a plurality of images of the first set, and generating the second stitched images comprises stitching together a plurality of images of the second set;
identifying a portion of the first stitched image corresponding to plant material using a machine learning model;
determining that a first set of geographic coordinates correspond to the portion of the first stitched image;
determining a strata of the plant material using the altitude data corresponding to the first set of geographic coordinates; and
determining health of the plant material based on a portion of the second stitched image corresponding to the first set of geographic coordinates.

16. The computer-implemented method of claim 15, further comprising training the machine learning model using training data that comprises a third set of images annotated to indicate portions of the third set of images in which second plant material is present and a fourth set of images annotated to indicate portions of the fourth set of images in which third plant material is not present.

17. The computer-implemented method of claim 15, further comprising generating a shape file that comprises at least one of the first stitched image, an indication that the first set of geographic coordinates correspond to the plant material, an indication of the heights of the plant material, or an indication of the health of the plant material.

18. The computer-implemented method of claim 17, further comprising:
generating user interface data that comprises the shape file; and
transmitting the user interface data to a user device, wherein the user interface data, when rendered by the user device, causes the user device to display a user interface in which data included in the shape file is depicted.

19. The computer-implemented method of claim 15, further comprising:
instructing the aerial vehicle to capture a third set of images while flying along the flight path;
processing the third set of images to form a third stitched image; and
determining soil moisture levels based on values of pixels in the third stitched image corresponding to the first set of geographic coordinates.

20. Non-transitory, computer-readable storage media comprising computer-executable instructions for detecting plant health, wherein the computer-executable instructions, when executed by a computer system, cause the computer system to:
instruct an aerial vehicle to commence a flight along a flight path such that the aerial vehicle captures a first set of images and a second set of images using at least one camera;
generate a first stitched image using by stitching together a plurality of images of the first set of images and a second stitched image by stitching together a plurality of images of the second set of images;
identify a portion of the first stitched image corresponding to plant material using a machine learning model;
determine that a first set of geographic coordinates correspond to the portion of the first stitched image; and
determine health of the plant material based on a portion of the second stitched image corresponding to the first set of geographic coordinates.

21. The non-transitory, computer-readable storage media of claim 20, wherein the computer-executable instructions further cause the computer system to determine a strata of the plant material using altitude data corresponding to the first set of geographic coordinates captured by the aerial vehicle using an altimeter.

22. The non-transitory, computer-readable storage media of claim 20, wherein the computer-executable instructions further cause the computer system to generate a shape file that comprises at least one of the first stitched image, an indication that the first set of geographic coordinates correspond to the plant material, an indication of the heights of the plant material, or an indication of the health of the plant material.

23. The non-transitory, computer-readable storage media of claim 22, wherein the computer-executable instructions further cause the computer system to:
generate user interface data that comprises the shape file; and
transmit the user interface data to a user device, wherein the user interface data, when rendered by the user device, causes the user device to display a user interface in which data included in the shape file is depicted.

24. The non-transitory, computer-readable storage media of claim 20, wherein the computer-executable instructions further cause the computer system to:
instruct the aerial vehicle to capture a third set of images while flying along the flight path;
process the third set of images to form a third stitched image; and
determine soil moisture levels based on values of pixels in the third stitched image corresponding to the first set of geographic coordinates.

25. The non-transitory, computer-readable storage media of claim 20, wherein the images of the first set are RGB images, and the images of the second set are chlorophyll images.

26. The non-transitory, computer-readable storage media of claim 20, wherein the RGB images and chlorophyll images are captured with a single camera.

27. The computer-implemented method of claim 15, wherein the images of the first set are RGB images, and the images of the second set are chlorophyll images.

28. The computer-implemented method of claim 27, wherein the RGB images and chlorophyll images are captured with a single camera.

* * * * *

UNITED STATES PATENT AND TRADEMARK OFFICE
CERTIFICATE OF CORRECTION

PATENT NO. : 11,074,447 B1
APPLICATION NO. : 16/510713
DATED : July 27, 2021
INVENTOR(S) : Andrew John Fox Page 1 of 1

It is certified that error appears in the above-identified patent and that said Letters Patent is hereby corrected as shown below:

In the Claims

In Column 46, Line 23, in Claim 20, after "image" delete "using".

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*